United States Patent [19]
Itami et al.

[11] Patent Number: 5,418,852
[45] Date of Patent: May 23, 1995

[54] UNAUTHORIZED USE PREVENTION METHOD FOR OPTICAL DISKS, OPTICAL DISK HAVING UNAUTHORIZED USE PREVENTION FUNCTION, AND OPTICAL DISK APPARATUS

[75] Inventors: Satoshi Itami; Kenichi Utsumi; Masahiro Nakada; Hiroshi Suzuki; Kazunori Naito; Kazuo Nakashima; Toshikatsu Narumi; Masaru Nakahara, all of Kawasaki, Japan

[73] Assignee: Fujitsu Limited, Kawasaki, Japan

[21] Appl. No.: 32,481

[22] Filed: Mar. 17, 1993

[30] Foreign Application Priority Data

| Mar. 18, 1992 | [JP] | Japan | 4-061882 |
| Mar. 18, 1992 | [JP] | Japan | 4-062608 |
| Mar. 18, 1992 | [JP] | Japan | 4-062609 |
| May 21, 1992 | [JP] | Japan | 4-129092 |

[51] Int. Cl.⁶ ............ G11B 15/05; G11B 19/04
[52] U.S. Cl. ............ 380/4; 380/5; 360/60
[58] Field of Search ............ 380/4, 5; 360/60

[56] References Cited

U.S. PATENT DOCUMENTS

| 4,462,078 | 7/1984 | Ross . | |
| 4,584,641 | 4/1986 | Guglielminu | 360/60 X |
| 4,785,361 | 11/1988 | Brotby | 380/4 X |
| 4,879,704 | 11/1989 | Takagi et al. | 360/60 X |
| 4,891,504 | 1/1990 | Gupta | 360/60 X |
| 5,065,429 | 11/1991 | Lang | 380/4 X |

FOREIGN PATENT DOCUMENTS

| 0294489 | 12/1988 | European Pat. Off. . |
| 63-26855 | 2/1988 | Japan . |
| 63-167474 | 7/1988 | Japan . |
| 666363A5 | 7/1988 | United Kingdom . |

OTHER PUBLICATIONS

German Office Action dated Feb. 16, 1994 (translation).

Primary Examiner—Gilberto Barrón, Jr.
Attorney, Agent, or Firm—Armstrong, Westerman, Hattori, McLeland & Naughton

[57] ABSTRACT

In a method for preventing unauthorized use of a recording medium having a user accessible area and a user inaccessible area, first information is read from the user inaccessible area of the recording medium. The first information is compared with second information concerning a true recording medium (lawfully produced copy). It is then concluded that the recording medium is the true recording medium when the first information corresponds to the second information.

53 Claims, 33 Drawing Sheets

| DATA FIELD Ad | ECC FIELD Ac | DATA FIELD | ECC FIELD Ac |
|---|---|---|---|
| TABLE-OF-CONTENTS DATA 512 BYTES | FFh 40 BYTES | ECC DATA + FFh 40 BYTES - 472 BYTES | ECC DATA 40 BYTES |

FIG. 34

| BYTE OFFSET | CONTENTS |
|---|---|
| 0 . . . . . | NUMBER OF GROUP = 1 |
| 4 ~ 5 | NUMBER OF GROUP = 1 |
| 6 ~ 8 | NUMBER OF SECTORS = 246990 |
| 9 ~ 11 | NUMBER OF SDARE SECTORS = 2860 |
| . . . . . 512 | |

UNAUTHORIZED USE PREVENTION METHOD FOR OPTICAL DISKS, OPTICAL DISK HAVING UNAUTHORIZED USE PREVENTION FUNCTION, AND OPTICAL DISK APPARATUS

BACKGROUND OF THE INVENTION

1. Field of the Invention

The present invention generally relates to optical disks, and more particularly to an unauthorized use prevention method, and an optical disk having an unauthorized use prevention function. Further, the present invention is concerned with an optical disk apparatus for reading data from an optical disk having such an unauthorized use prevention function.

2. Description of the Prior Art

An optical disk has a large data storage capacity, and data can be easily read from the optical disk and recorded thereon by a random access method. From the above point of view, optical disks have been widely used. In the specification, the term "an optical disk" includes a magneto-optical disk.

With the spread of use of optical disks, the problem of data recorded on an optical disk being unlawfully copied onto another recording medium becomes significant. Hence, it is necessary to provide an unauthorized use prevention method in order to facilitate the spread of use of optical disks while the copyright of data and programs recorded on the optical disks is protected.

FIG. 1 is a block diagram illustrating an overview of a conventional optical disk apparatus. The optical disk apparatus shown in FIG. 1 is made up of a host computer 10, an optical disk drive 11, and a SCSI (Small Computer Systems Interface) unit 12. An optical disk 1 is loaded in the optical disk drive 11 via a disk inserting opening 11a. The optical disk drive 11 reads data from the optical disk. In some apparatus, the optical disk drive 11 has the function of recording data on the optical disk 11. The host computer 10 and the optical disk drive 11 can communicate with each other via the SCSI unit 12.

FIG. 2 illustrates the format of the optical disk according to the ISO (International Standards Organization) standard (ISO 10090), the disclosure of which is hereby incorporated by reference. A user accessible area A is composed of tracks between the third track and the 9996th track. The user accessible area A can be used in one of the following manners. The whole user accessible area A is used as a RAM area (also referred to as a rewritable area), or a ROM area. Alternatively, as shown in FIG. 2, the user accessible area A includes a ROM area 15 and a RAM area (rewritable area) 16 (a partial ROM type). Data can be magnetically recorded on the RAM area. Data can be recorded on the ROM area by forming pits on the recording surface.

Three tracks located further out than the user accessible area A function as a DMA (Defect Management Area) B, which is not allowed to be accessed in a normal mode by the user. Data necessary for disk management is recorded on the management area B. For example, data indicating the address range of the ROM area 15 and the address range of the RAM area 16 is recorded on the defect management area B. Data recorded on the defect management area can be accessed in a maintenance mode. Similarly, three tracks are located further in than the user accessible area A. Outer control tracks are formed in an area C located further out than the outer defect management area B, and inner control tracks are formed in an area C located further in than the inner defect management area B. A blank area D is provided further out than the outer control track area C, and a blank area D is provided further in than the inner control track area C.

Normally, the areas B, C and D are referred to as the user inaccessible areas.

Data recorded on the ROM area 15 can be utilized by an application program executed by the host computer 30.

Nowadays, optical disks, on which a variety of data to be protected by copyright is recorded, are sold. For example, data of dictionaries, encyclopedias, novels, game programs and so on are recorded on the optical disks. Hence, it is necessary to prevent data recorded on the optical disks from being unlawfully copied. Particularly, rewritable 3.5 inch optical disks will be widely used.

Japanese Laid-Open Patent Publication No. 60-145501 proposes an unauthorized use prevention method. According to the proposed method, a mark is recorded on an area inherent in a recording medium by physical means. The mark is read from the recording medium and is compared with a reference pattern stored in a reproducing apparatus. When the mark which is the same as the reference pattern is not detected, it is determined that the recording medium is an unlawfully produced recording medium.

Japanese Laid-Open Patent Publication No. 63-26855 proposes another unauthorized use prevention method, in which valid data is recorded on a read only area on a recording medium. Normally, the valid data recorded on the recording medium cannot be read and transferred to a read only area of another recording medium. The valid data is absent in the read only area of the unlawfully produced recording medium.

However, the unauthorized use prevention method disclosed in Japanese Laid-Open Patent Publication No. 60-145501 has a disadvantage in that it needs the physical means for recording the inherent mark on the recording medium and that the inherent mark may be inconsistent with the ISO standard.

The unauthorized use prevention method disclosed in Japanese Laid-Open Patent Publication No. 63-26855 has a disadvantage in that it cannot completely prevent unauthorized copy because the valid data recorded on the read only area can be transferred to an area other than the read only area of another recording medium.

SUMMARY OF THE INVENTION

It is a general object of the present invention to provide an unauthorized use prevention method in which the above disadvantages are eliminated.

A more specific object of the present invention is to provide an unauthorized use prevention method capable of effectively preventing unlawful copying wherein optical disks are consistent with the ISO standard.

The above objects of the present invention are achieved by a method for preventing unauthorized use of a recording medium having a user accessible area and a user inaccessible area, the method comprising the steps of: (a) reading first information from the user inaccessible area of the recording medium; (b) comparing the first information with second information concerning a true recording medium (lawfully produced copy) ; and (c) making a decision that the recording medium is the true recording medium when first information corresponds to the second information.

The above objects of the present invention are also achieved by a method for preventing unauthorized use of a recording medium having a user accessible area and a user inaccessible area, the method comprising the steps of: (a) reading first information from a storage portion of a ROM area in the user accessible area of the recording medium using a predetermined address; (b) comparing the first information with second information designed to be stored in the storage portion of the ROM area of a true recording medium specified by the predetermined address; and (c) making a decision that the recording medium is the true recording medium when the first information corresponds to the second information.

The above objects of the present invention are also achieved by a method for preventing unauthorized use of a recording medium having a user accessible area and a user inaccessible area, the method comprising the steps of: (a) generating a write instruction to record data on a storage area of the recording medium specified by a predetermined address indicating a ROM area of a true recording medium; (b) determining whether or not the data can be recorded on the recording medium; and (c) making a decision that the recording medium is the true recording medium when it is determined that the data cannot be recorded on the recording medium.

The above objects of the present invention are also achieved by a method for preventing unauthorized use of a recording medium having a user accessible area and a user inaccessible area, the method comprising the steps of: (a) reading predetermined information from a predetermined storage area of the recording medium, first information being necessary to read data from the user accessible area of the recording medium; (b) determining whether or not the predetermined information has been read from the predetermined storage area; and (c) making a decision that the recording medium is a true recording medium when it is determined that the predetermined information has been read.

Another object of the present invention is to provide an apparatus based on the above-mentioned methods.

This object of the present invention is achieved by an apparatus for preventing unauthorized use of a recording medium having a user accessible area and a user inaccessible area, the method comprising: first means for reading first information from the user inaccessible area of the recording medium; second means, coupled to the first means, for comparing the first information with second information concerning a true recording medium; and third means, coupled to the first and second means, for making a decision that the recording medium is the true recording medium when the first information corresponds to the second information.

The above object of the present invention is also achieved by an apparatus for preventing unauthorized use of a recording medium having a user accessible area and a user inaccessible area, the apparatus comprising: first means for reading first information from a storage portion of a ROM area in the user accessible area of the recording medium using a predetermined address; second means, coupled to the first means, for comparing the first information with second information designed to be stored in the storage portion of the ROM area of a true recording medium specified by the predetermined address; and third means, coupled to the first and second means, for making a decision that the recording medium is the true recording medium when the first information corresponds to the second information.

The above object of the present invention is also achieved by an apparatus for preventing unauthorized use of a recording medium having a user accessible area and a user inaccessible area, the apparatus comprising: first means for generating a write instruction to record data on a storage area of the recording medium specified by a predetermined address indicating a ROM area of a true recording medium; second means, coupled to the first means, for determining whether or not the data can be recorded on the recording medium; and third means, coupled to the first and second means, for making a decision that the recording medium is the true recording medium when it is determined that the data cannot be recorded on the recording medium.

The above object of the present invention is also achieved by an apparatus for preventing unauthorized use of a recording medium having a user accessible area and a user inaccessible area, the apparatus comprising: first means for reading predetermined information from a predetermined storage area of the recording medium, first information being necessary to read data from the user accessible area of the recording medium; second means, coupled to the first means, for determining whether or not the predetermined information has been read from the predetermined storage area; and third means, coupled to the first and second means, for making a decision that the recording medium is a true recording medium when it is determined that the predetermined information has been read.

A yet another object of the present invention is to provide an optical disk based on the above-mentioned methods.

This object of the present invention is achieved by an optical disk comprising: a user accessible area; and a user inaccessible area, the user inaccessible area comprising first information to be read and compared with second information concerning a true recording medium in order to determine whether or not the recording medium is the true recording medium.

The above object of the present invention is also achieved by an optical disk comprising: a user accessible area; and a user inaccessible area, the user accessible area comprising a storage portion of a ROM area, the storage portion being specified by a predetermined address, the storage area storing first information to be read and compared with second information designed to be stored in the storage portion of the ROM area of a true recording medium in order to determine whether or not the recording medium is the true recording medium.

The above object of the present invention is also achieved by an optical disk comprising: a user accessible area; and a user inaccessible area, predetermined information being stored in either the user accessible area or the user inaccessible area, the predetermined information being necessary to read data from the user accessible area of the recording medium.

BRIEF DESCRIPTION OF THE DRAWINGS

Other objects, features and advantages of the present invention will become more apparent from the following detailed description when read in conjunction with the accompanying drawings, in which:

FIG. 34 is a block diagram illustrating how information is recorded on disk definition sectors according to a seventh embodiment of the present invention.

DESCRIPTION OF THE PREFERRED EMBODIMENTS

Figure 1:
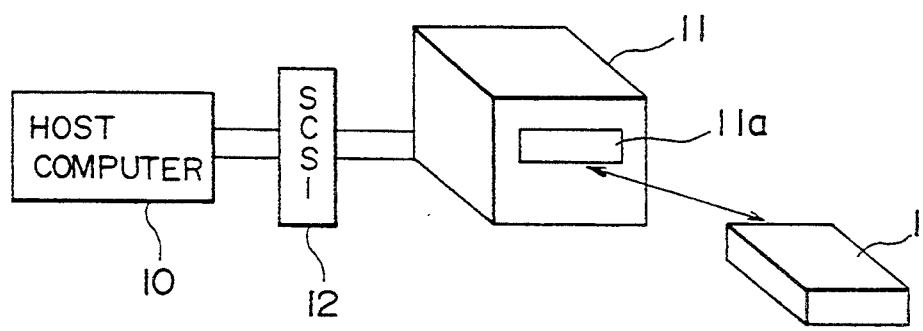
FIG. 1 is a block diagram of a conventional optical disk apparatus.
Figure 3:
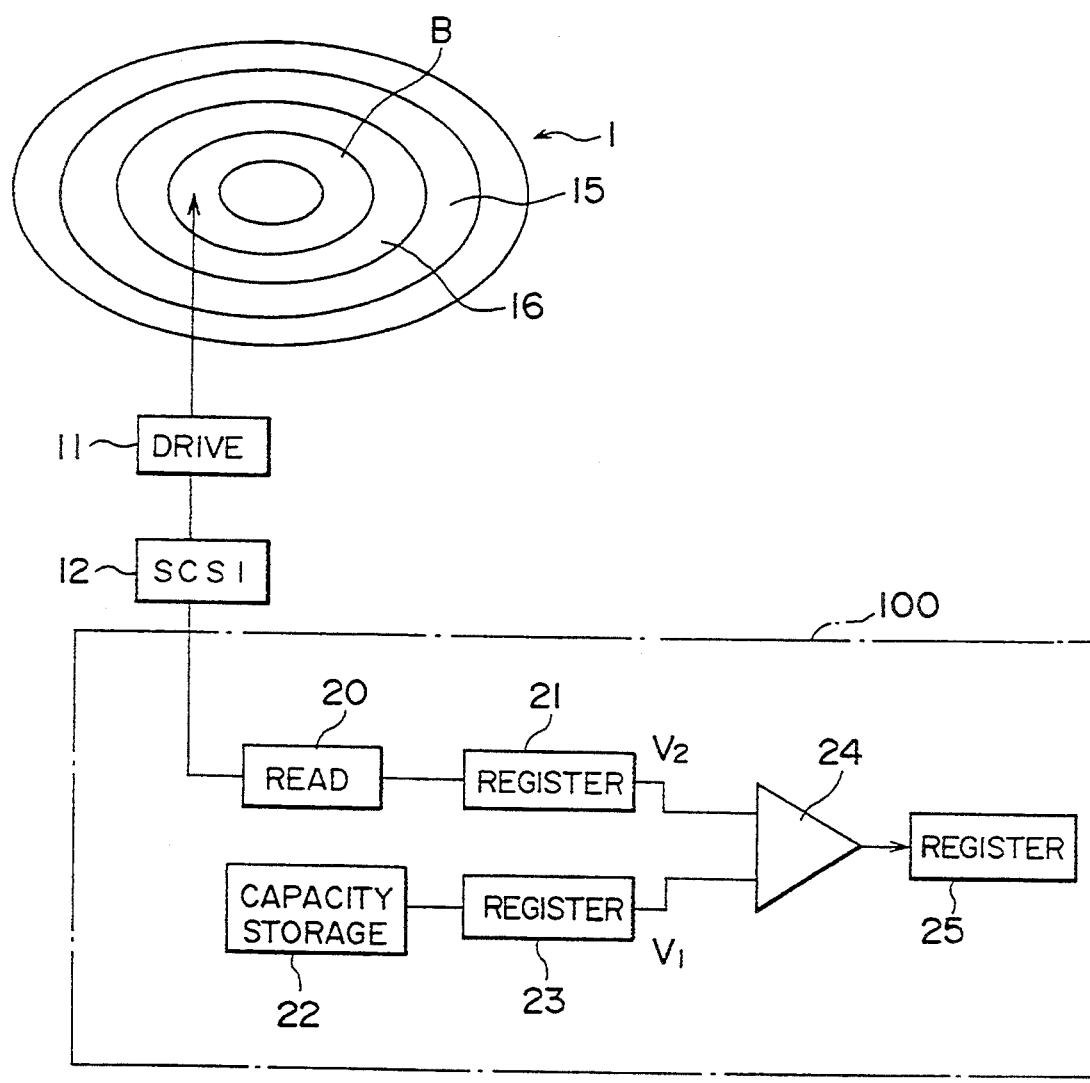
FIG. 3 is a block diagram of a first embodiment of the present invention.

FIG. 3 is a block diagram illustrating an overview of a first embodiment of the present invention. In FIG. 3, parts that are the same as parts shown in FIG. 1 are given the same reference numbers. The first embodiment of the present invention is intended to determine whether or not the optical disk 1 has the ROM area 15 in order to detect unauthorized use.

Figure 4:
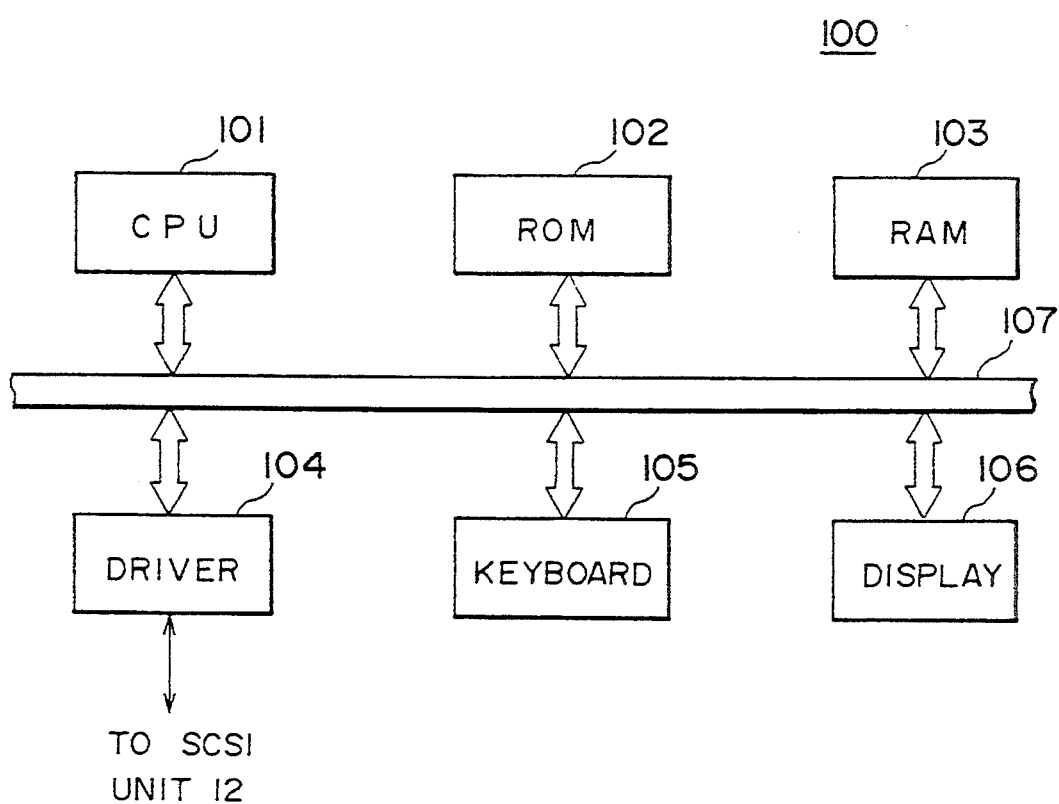
FIG. 4 is a block diagram of a host computer used in embodiments of the present invention.

A host computer 100, which is connected to the SCSI unit 12, is made up of a read unit 20, a register 21, a capacity storage unit 22, a register 23, a comparator 24, and a register 25. In practice, as shown in FIG. 4, the host computer 100 is made up of a CPU 101, a ROM 102, a RAM 108, a driver 104 connected to the SCSI unit 12, a keyboard 105, and a display 106. These elements are connected to each other via a bus 107. An output means, such as a printer, can be connected to the CPU 101 via the driver 104. The structural elements 20-25 of the host computer 100 shown in FIG. 3 are realized by the CPU 101.

Data utilized by an application program executed by the CPU 101 is recorded on the ROM area 15 in the form of pits (recess or projection surface portions) formed on the recording surface of the optical disk 1. As has been described, the defect management area (DMA) area B further in than the RAM area 16 cannot be accessed by the user. Data indicating the storage capacity L (=V2) of the RAM area 16 on the optical disk 1 is recorded on the defect management area B. Further, data necessary for management of the optical disk 1 is also recorded on the defect management area B. The capacity storage unit 22 stores, as a true storage capacity, the above-mentioned storage capacity L (=V1). The read unit 20 reads the data indicating the storage capacity L (=V2) from the optical disk 1 via the drive 11 and the SCSI unit 12.

Data indicating the storage capacity V2 read by the read unit 20 is applied to the comparator 24 via the register 21, and the data indicating the storage capacity V1 is applied to the comparator 24 via the register 23. When it is determined by the comparator 24 that the storage capacity V2 is equal to the storage capacity V1, corresponding flag data, for example, "1", is written into the register 25. In the other case, corresponding flag data, for example, "0" is written into the register 25. When the flag data indicates "0", it is concluded that the optical disk i has been unlawfully produced.

Figure 5:
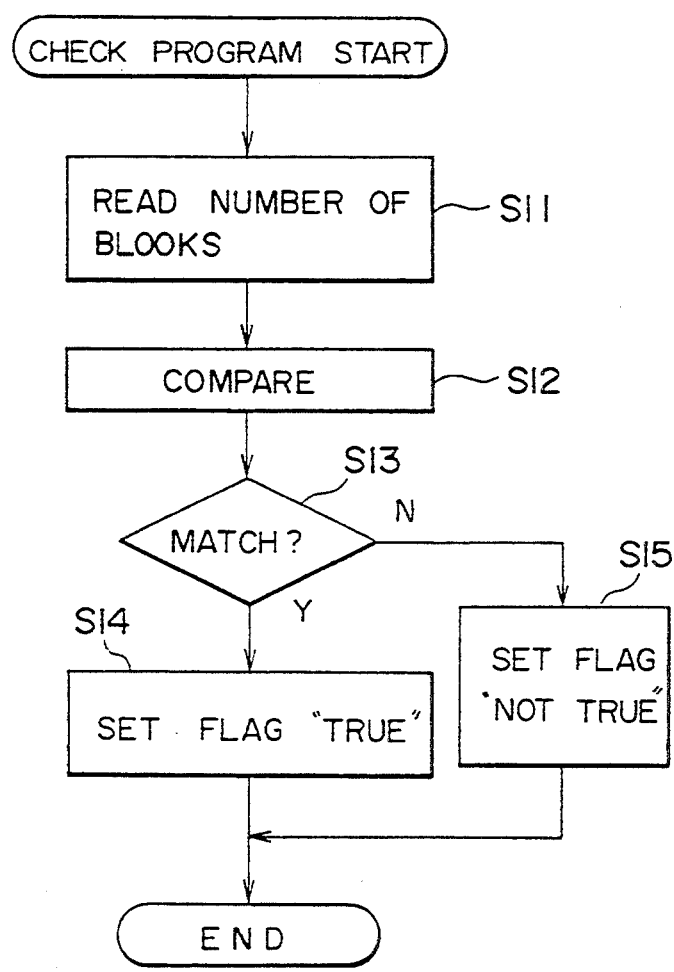
FIG. 5 is a flowchart illustrating the operation of the first embodiment of the present invention.

More particularly, the CPU 101 shown in FIG. 4 realizes the above disk check process in accordance with a disk check program shown in FIG. 5. The disk check program is loaded in the RAM 103. In step S11, the CPU 101 reads data indicating the storage capacity V2 of the RAM area 18 via the optical disk drive 11, the SCSI interface 12 and the driver 104. Normally, the RAM area 18 is segmented into a plurality of blocks. Hence, the data indicating the storage capacity V2 of the RAM area 16 indicates the number of blocks of the RAM area 16. In step S12, the CPU 101 compares the storage capacity V2 with the storage capacity V1 loaded in the RAM 103 (corresponding to the capacity storage unit 22 shown in FIG. 3). The CPU 101 determines, in step S13, whether or not V2=V1. When the result of step S13 is YES, the CPU 101 writes the corresponding flag data ("1", for example) into a predetermined work area of the RAM 103 in step S14. When the result of step S13 is NO, the CPU 101 writes the corresponding flag data ("0", for example) into the predetermined work area in step S15. The flag data can be displayed on the display 106 under control of the CPU 101. Alternatively, it is possible to print out the flag data on a recording sheet by means of a recording unit (not shown), such as a printer, connected to the driver 104.

It will be noted that the storage capacity V2 of the RAM area 12 recorded on the defect management area B cannot be transferred to another optical disk. Hence, it is possible to determine whether or not the optical disk 1 is an unlawfully produced optical disk by comparing the read storage capacity data V2 with the storage capacity data V1 stored in the unit 22.

Figure 6:
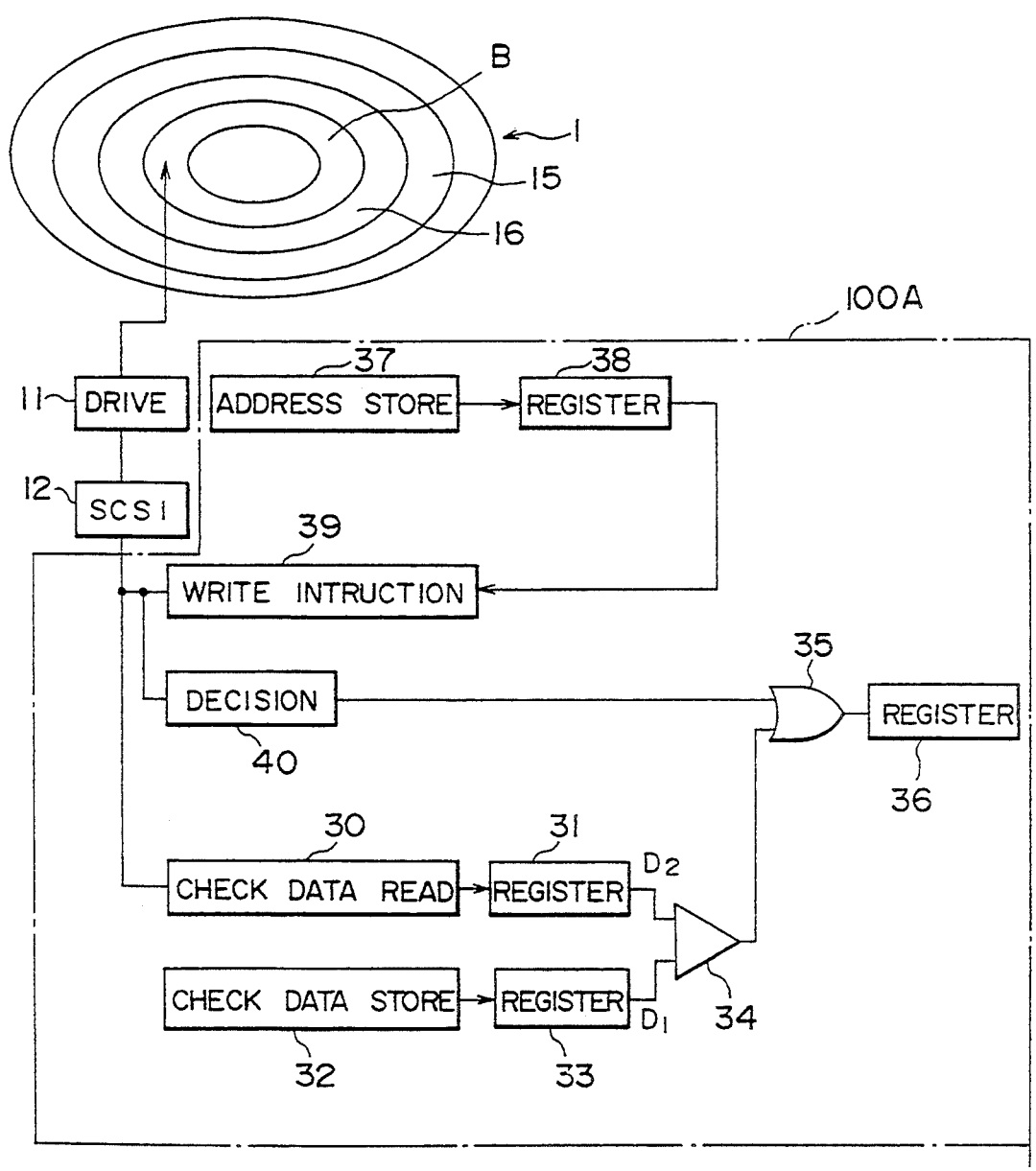
FIG. 6 is a block diagram of a second embodiment of the present invention.

A description will now be given of a second embodiment of the present invention. FIG. 6 is a block diagram of the configuration of the second embodiment of the present invention. A host computer 101A shown in FIG. 6 is made up of a check data read unit 30, a register 31, a check data storage unit 32, a register 33, a comparator 34, an OR gate 35, a register 36, an address storage unit 37, a register 38, a write 10 instruction unit 39, and a decision unit 40. These structural elements of the host computer 100A shown in FIG. 6 are realized by the CPU 101 shown in FIG. 4. That is, the host computer 100A has the same hardware structure as the host computer 100.

Figure 7:
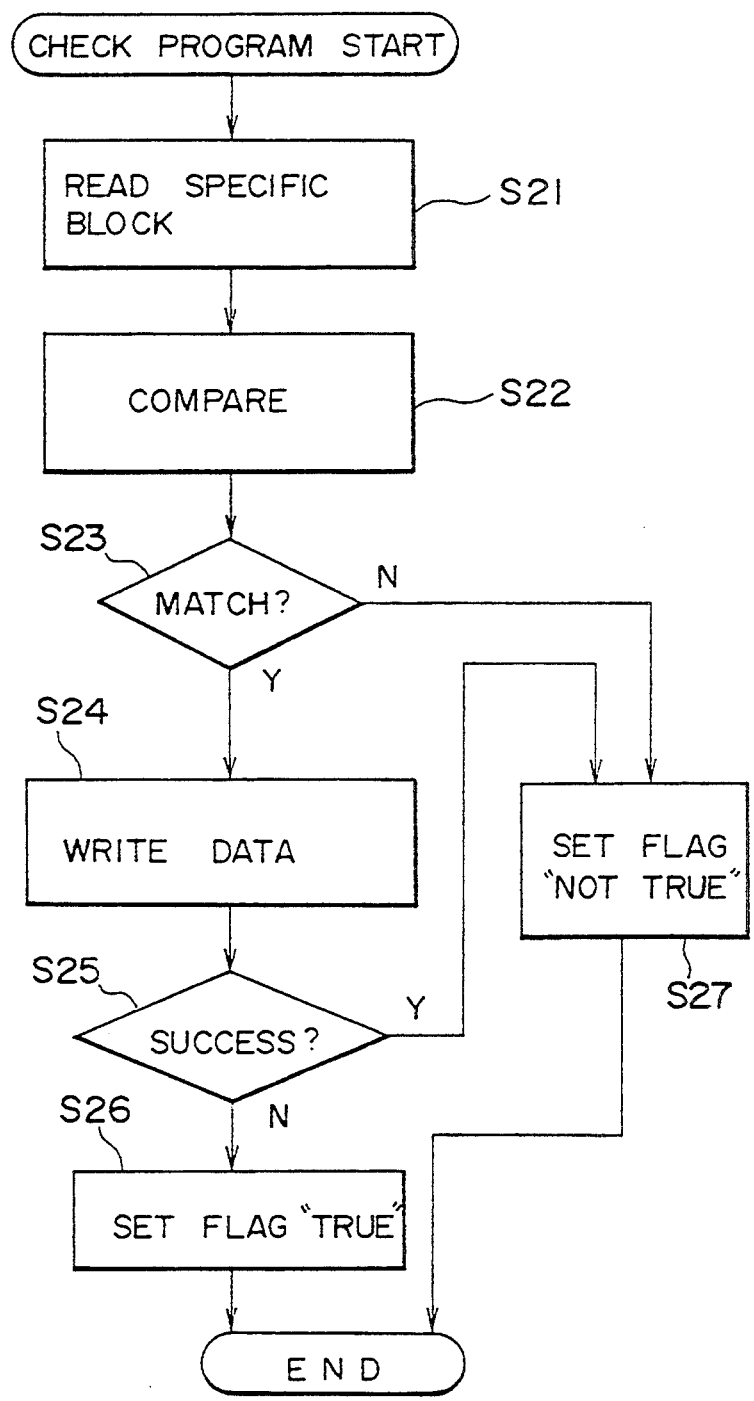
FIG. 7 is a flowchart illustrating the operation of the second embodiment of the present invention.

FIG. 7 is a flowchart of a disk check program loaded in the RAM 103 of the host computer 100A and executed by the CPU 100. According to the second embodiment of the present invention, check data D2 is recorded on one or a plurality of predetermined blocks specified by a predetermined address on the optical disk 1. In step S21 shown in FIG. 7, the check data read unit 30 reads the check data D2 from the optical disk 1, and applies the read check data D2 to the comparator 34 via the register 31. The check data storage unit 32 stores check data D1 which is the same as the check data D2. The check data D1 is applied to the comparator 34 via the register 33. In step S22, the comparator 34 compares the check data D1 with the check data D2, and determines whether or not D2=D1 in step 23. When D2 is not equal to D1, it is determined that the optical disk 1 is an unlawfully produced optical disk, and the comparator writes the corresponding flag data into the register 36 via the OR gate 35 in step S27.

Figure 8:
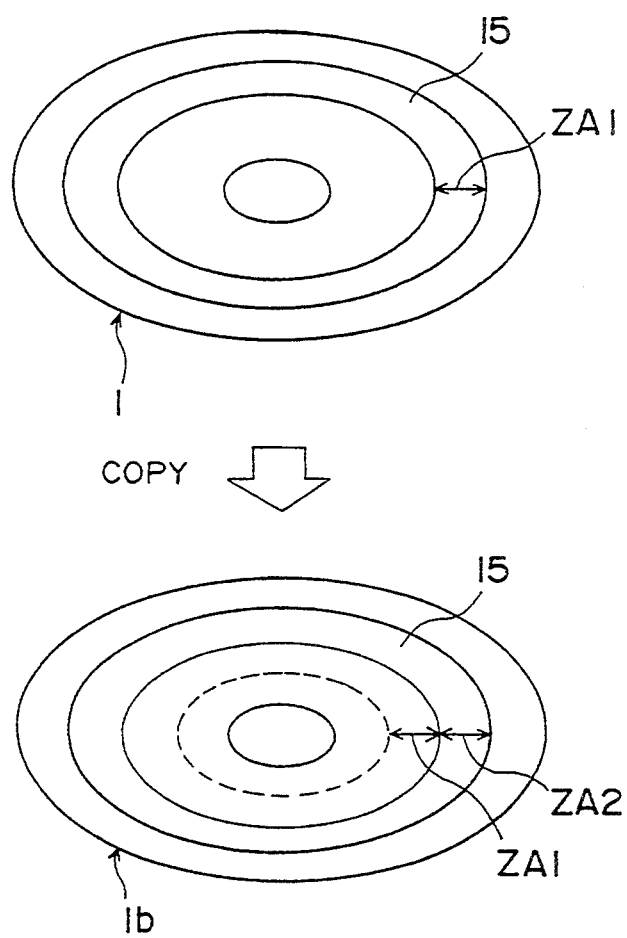
FIG. 8 is a diagram showing the function of the second embodiment of the present invention.

The second embodiment is effective for a case shown in FIG. 8. Check data recorded on a storage area ZA1 in the ROM area 15 of an optical disk 1a is copied onto a storage area ZA2 of an optical disk 1b located further out than the address area ZA1. Data stored in the area ZA1 of the optical disk 1b (copy destination) is different from the check data stored in the area ZA1 of the optical disk 1a (copy source). The second embodiment can detect the above mismatch.

If check data which is the same as the check data recorded on the area ZA1 of the copy source disk 1a is recorded on the area ZA1 of the copy destination disk 1b, it is impossible to determine whether or not the optical disk is an unlawfully produced disk.

With the above in mind, the address storage unit 37 (FIG. 6) stores a specific address specifying a predetermined area in the ROM area 11 of the optical disk 1a. The specific address is placed in the register 38. The write instruction unit 39 reads the specific address stored in the register 38, and sends a write instruction to the optical disk drive 11 via the SCSI unit 12 in step S24 shown in FIG. 7. The decision unit 40 determines, in step S25, whether or not writing of data by the above write instruction is successful. When the result of step S25 is negative, the decision unit 40 writes the corresponding flag data into the register 36 via the OR gate 35 in step S27. When the optical disk 1 is a true optical disk, data cannot be recorded on the specified area in the ROM area 15. In this case, the SCSI unit 12 informs the CPU 101 that data cannot be written into the specified area.

When the optical disk 1 is an unlawfully produced disk, the storage area specified by the specific address is located in the RAM area 16. In this case, the SCSI unit 12 accepts the write instruction. Then, the decision unit 40 writes the corresponding flag data into the register 36 via the OR gate 35 in step S26.

Figure 9:
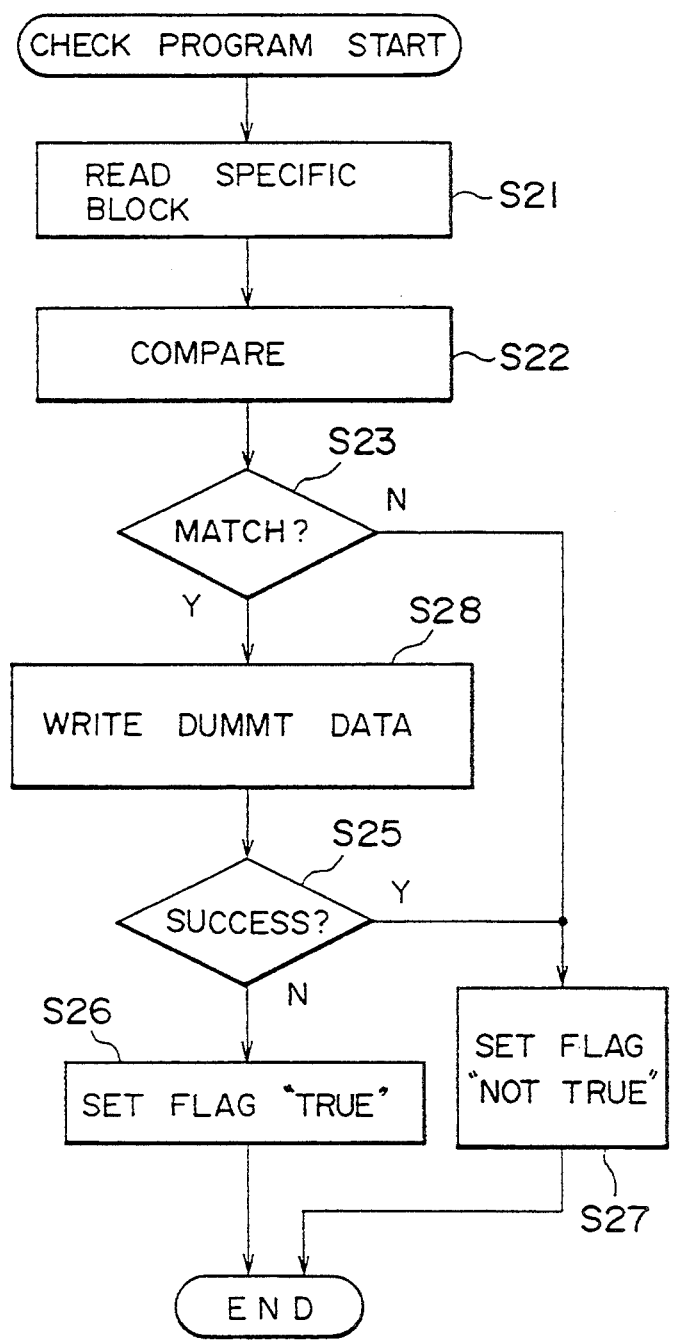
FIG. 9 is a flowchart illustrating the operation of a variation of the second embodiment of the present invention.

FIG. 9 is a flowchart of a variation of the second embodiment of the present invention. In FIG. 9, steps that ape the same as steps shown in FIG. 7 are given the same reference numbers. Step S28 is substituted fop step S24 shown in FIG. 7. When it is determined that the read data D2 is the same as the data stored in the check data storage unit 32 shown in FIG. 6, the write instruction unit 39 writes dummy data into the specified storage area (which is actually located in the RAM area 16). Thereby, the data copied in the unauthorized manner can be destroyed.

Figure 10:
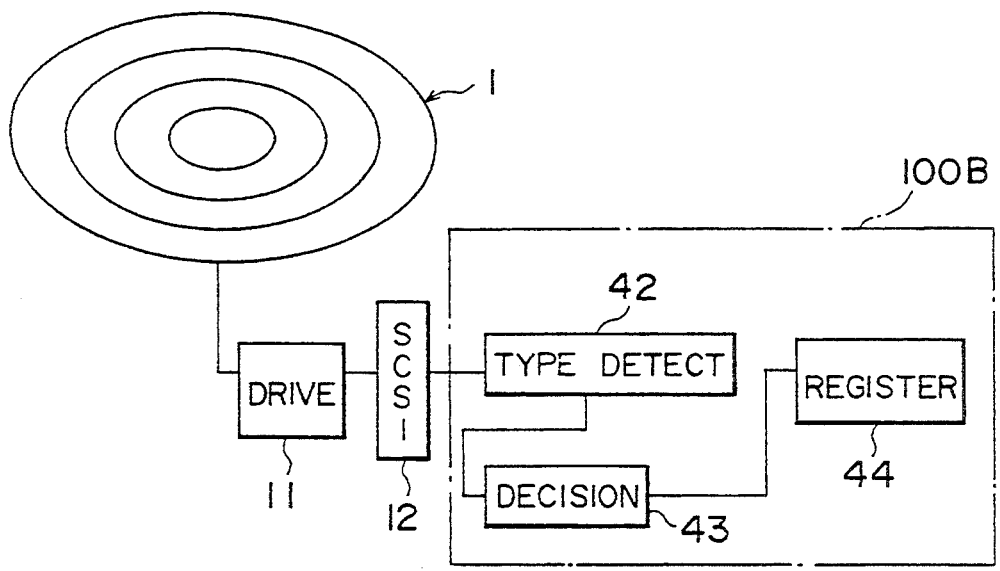
FIG. 10 is a block diagram of a third embodiment of the present invention.

A description will now be given of a third embodiment of the present invention by referring to FIG. 10. A host computer 100B includes a medium type detection unit 42, a decision unit 43 and a register 44. The actual hardware structure of the host computer 100B is the same as that of the host computer 100 shown in FIG. 4.

Normally, the optical disk drive 11 has the function of determining whether or not the optical disk 1 (recording medium) loaded in therein is removable. If data recorded on a lawfully produced and sold optical disk is copied onto an optical disk which is not removable from an optical disk drive, it is possible to determine that the data recorded on the optical disk that is not removable is unlawfully copied data by determining whether or not the optical disk is removable.

Figure 11:
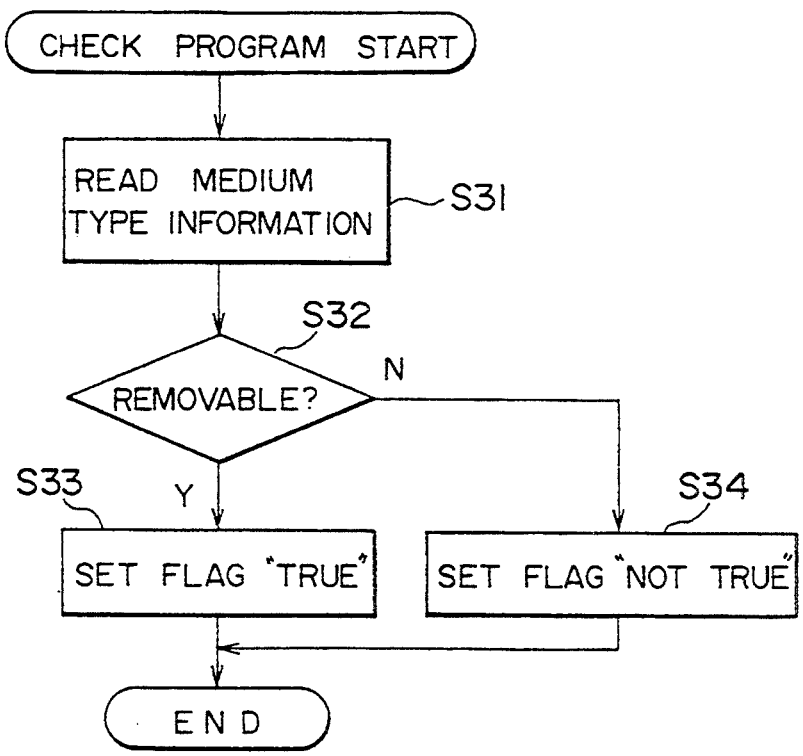
FIG. 11 is a flowchart illustrating the operation of the third embodiment of the present invention.

The medium type detection unit 42 is informed of the result of the above determination by the optical disk drive 11 via the SCSI unit 12. More specifically, in step S31 shown in FIG. 11, the medium type detection unit 42 receives a decision signal indicating whether or not the optical disk 1 (recording medium) is removable from the optical disk drive 11. The decision unit 43 determines, in step S32, whether or not the decision signal from the optical disk drive 11 indicates that the optical disk 1 is removable. When it is determined that the optical disk 1 is removable, the decision unit 43 writes corresponding flag data indicating the result of the above decision into the register 44 in step S33. When it is determined that the optical disk 1 is not removable, the decision unit 43 writes corresponding flag data into the register 44 in step S34.

Figure 12:
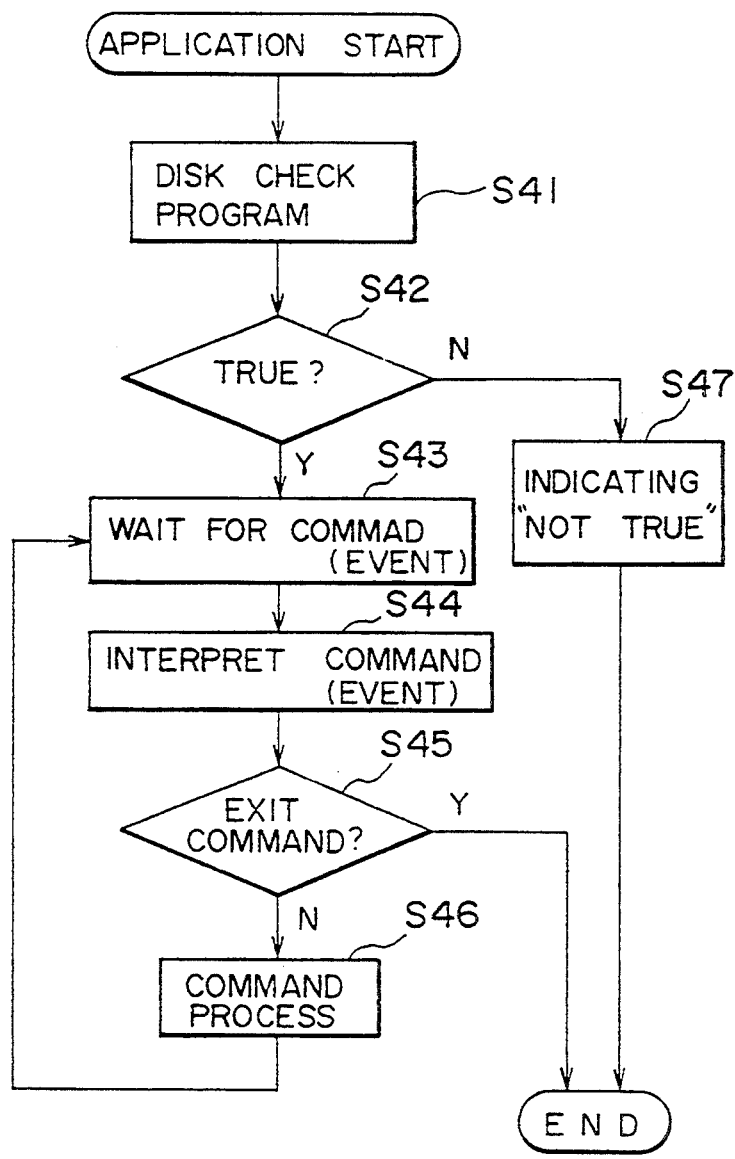
FIG. 12 is a flowchart illustrating how disk check programs according to embodiments of the present invention are executed.

An application program executed by the CPU 101 (FIG. 4) utilizes the flag data written into the register 25, 36 or 44, as shown in FIG. 12. The CPU 10 101 starts an application program, and executes the aforementioned disk check program shown in FIG. 5, FIG. 7, FIG. 9 or FIG. 11 in step S41. In step S42, the CPU 101 refers to the register 25, 36 or 44, and determines whether or not the optical disk 1 loaded in the optical disk drive 11 is true. When it is determined that the optical disk 1 is not true, the CPU 101 makes the display unit 106 display a corresponding message, and does not execute the application program. When it is determined, in step S42, that the optical disk 1 is true, the CPU 101 waits for inputting of a command or event in step S43. In step S44, the CPU 44 interprets the input command or event, and executes a requested process in step S46. When the input command or event request termination of execution of the application program, the CPU 101 ends execution of the application program.

Figure 13:
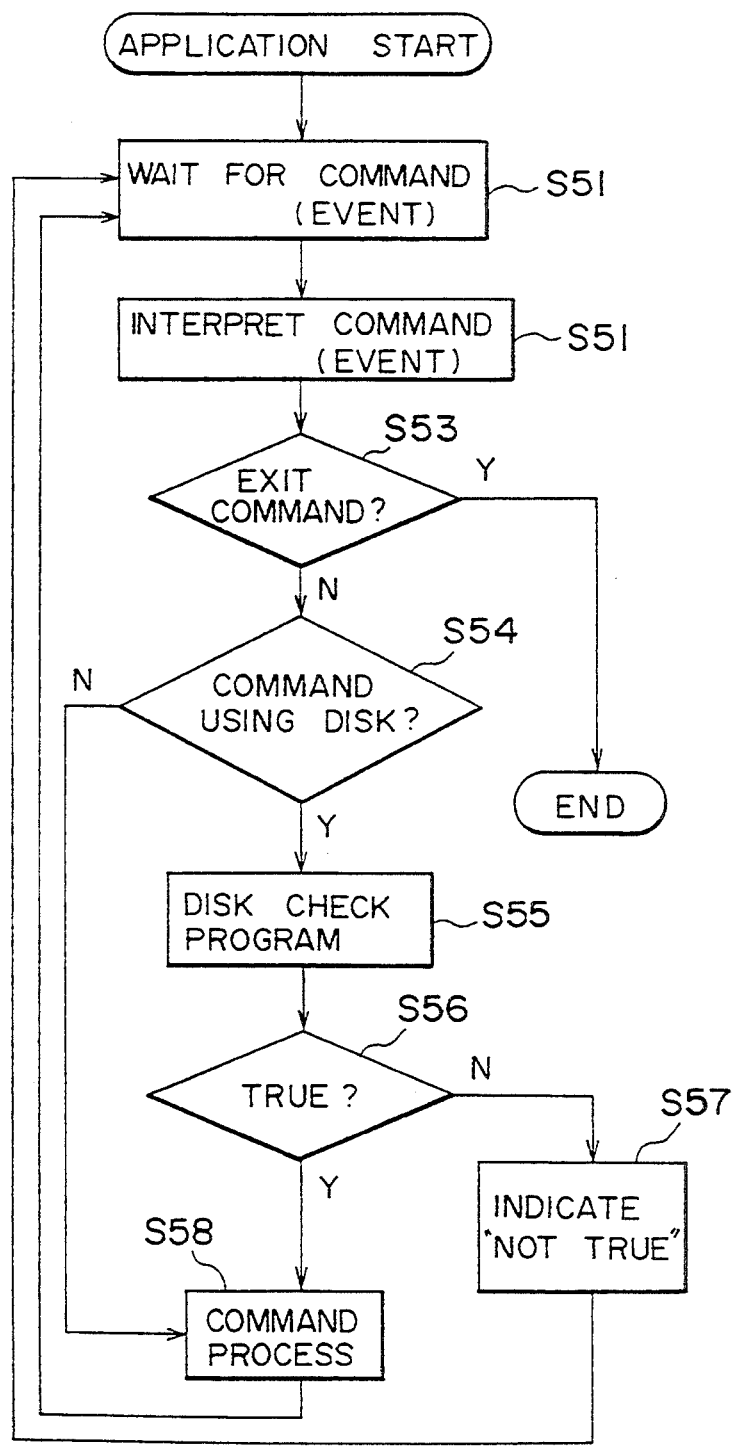
FIG. 13 is a flowchart illustrating a variation of the procedure shown in FIG. 12.

FIG. 13 illustrates another procedure showing how the CPU 101 utilizes the flag data written into the register 25, 36 or 44. After an application program is started, steps S51, S52 and S53 respectively corresponding to the steps S43, S44 and S45 shown in FIG. 12 are executed by the CPU 101. When it is determined, in step S53, that the input command requests to terminate execution of the application program, the CPU 101 determines, in step S54, whether or not the input command uses data recorded on the optical disk 1. When the result of step S54 is NO, the CPU 101 executes the input command. When the result of step S54 is YES, the CPU 101 executes the aforementioned disk check program shown in FIG. 5, FIG. 7, FIG. 9 or FIG. 11. When it is determined, in step S56, that the optical disk 1 is true, the CPU 101 executes the input command in step S58. When the result of step S58 is NO, the CPU 101 makes the display unit 108 display the corresponding message in step S57.

Figure 14:
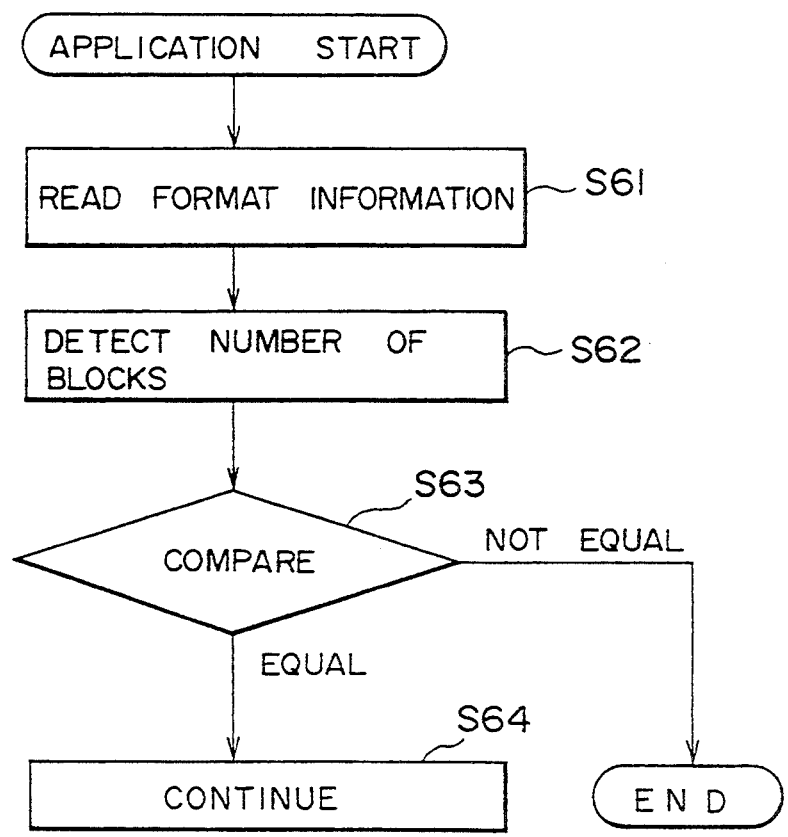
FIG. 14 is a flowchart of a variation of the first embodiment of the present invention.

The above-mentioned first, second and third embodiments of the present invention are not limited to optical disks, and are applicable to other recording media, such as IC cards. Normally, these recording media have a ROM area and a RAM area. For example, it is possible to determine whether or not an IC card is true according to an IC card check program shown in FIG. 14.

In step S61, an IC card reader/writer used instead of the aforementioned optical disk drive 11 reads format information of the IC card recorded 20 thereon. The format information is sent to the CPU 101 of the host computer shown in FIG. 4. The CPU 101 detects the number of blocks forming the RAM area in step S62. In step S63, the CPU 101 determines whether or not the number of blocks obtained in step S62 is equal to a predetermined number of blocks loaded in the RAM 103 of the host computer 100. When the result of step S63 is affirmative, the CPU 101 starts to execute an application program. When the result of step S63 is negative, the CPU 101 does not start the application program, and makes the display unit 106 display the corresponding message.

A description will now be given of a fourth embodiment of the present invention. According to the fourth embodiment of the present invention, data necessary for management of the optical disk, or table-of-contents data indicating positions of files recorded thereon is recorded on the user inaccessible area including the areas B, C and D shown in FIG. 2. In other words, data recorded on the user accessible area cannot be read unless data recorded on the user inaccessible area is read. Alternatively, identification (ID) data or flags may be recorded on the user inaccessible area.

Figure 2:
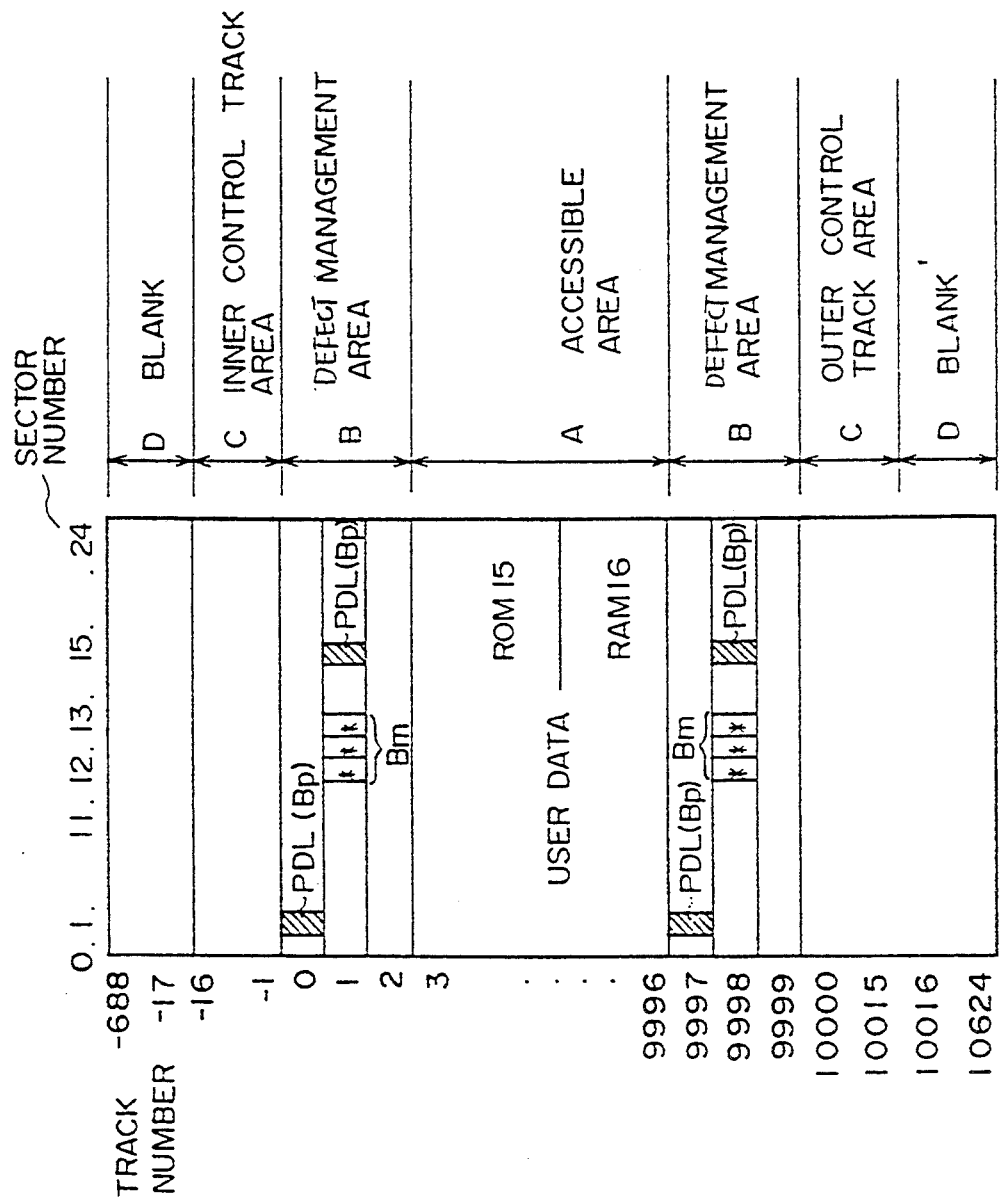
FIG. 2 is a diagram of the format of an optical disk prescribed in the ISO standard.

For example, the data management areas (DMA) B shown in FIG. 2 can be used to record data necessary to read data. More particularly, primary defect list (PDL) areas Bp or blank (not used) areas Bm in the defect management areas B can be used to record the necessary data. It is also possible to a remaining area Ac in the RAM area 16.

According to the fourth embodiment of the present invention, data recorded on the RAM area 16 cannot be read unless the necessary data recorded on the user inaccessible area is read. The necessary data recorded on the user inaccessible area cannot be copied onto another optical disk. Hence, it is impossible to read data from the user accessible area of the unlawfully produced optical disk.

Figure 15:
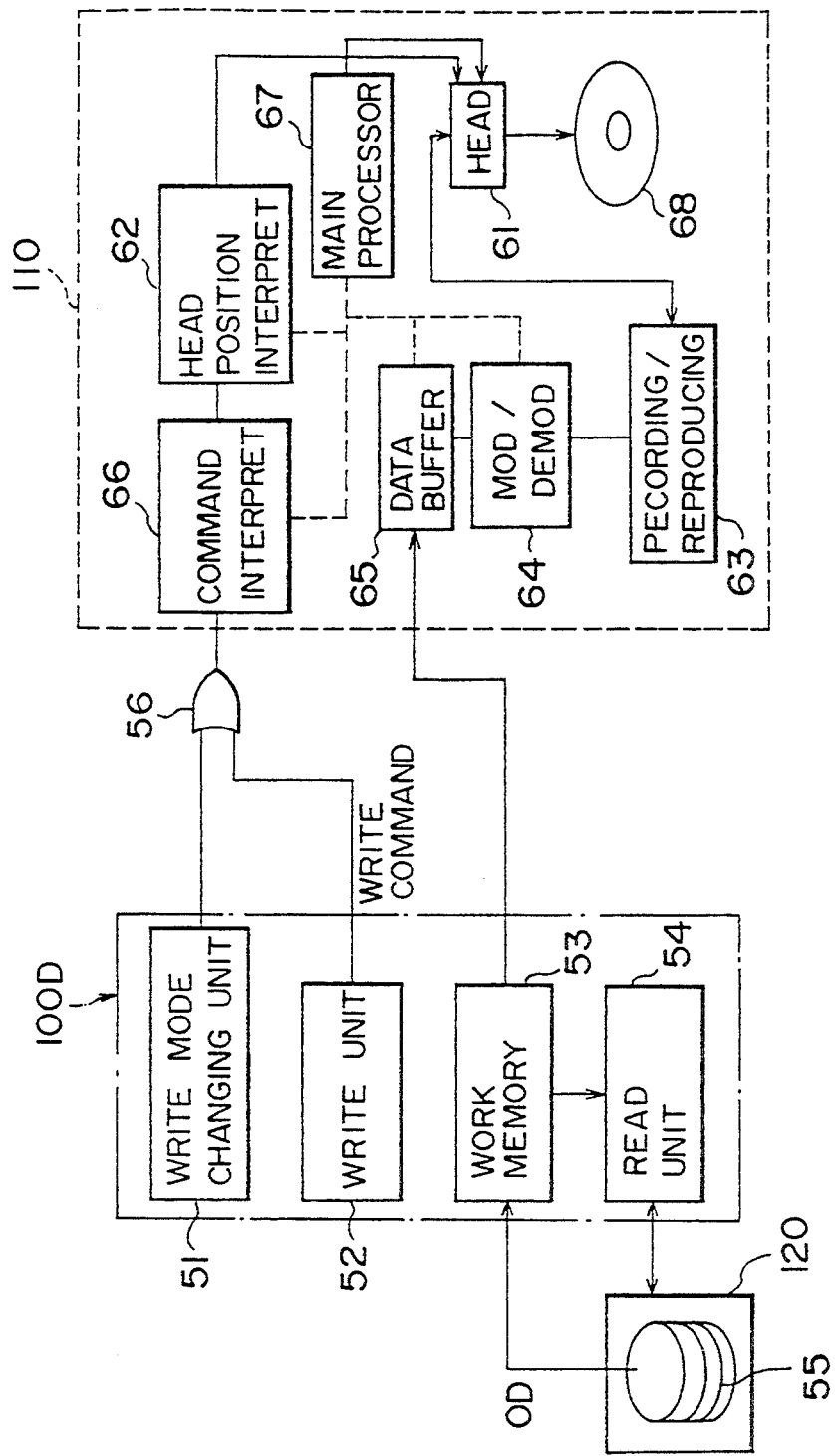
FIG. 15 is a block diagram of a data writing system used in a fourth embodiment of the present invention.

FIG. 15 is a block diagram of a data writing (optical disk producing) system for recording data on an original optical disk on which data preventing unauthorized use is recorded according to the fourth embodiment of the present invention. The system shown in FIG. 15 is made up of a host computer 100D, a disk drive 110 and a drive 120 for reading data from an external recording medium 55 and writing data to the medium 55. The host computer 100D is made up of a write mode changing unit 51, a write unit 52, a work memory 53 and an original data read unit 54. The actual hardware structure of the host computer 100D is the same as that of the host computer 100 shown in FIG. 4. The disk drive 110 includes a head 61, a head position interpreter 62, a recording/reproducing unit 63, a data modulation/demodulation unit 64, a data buffer 65, a command interpreter 68, and a main processor 67. The block denoting the head 61 includes a head actuator controlled by the main processor 67.

Figure 18:
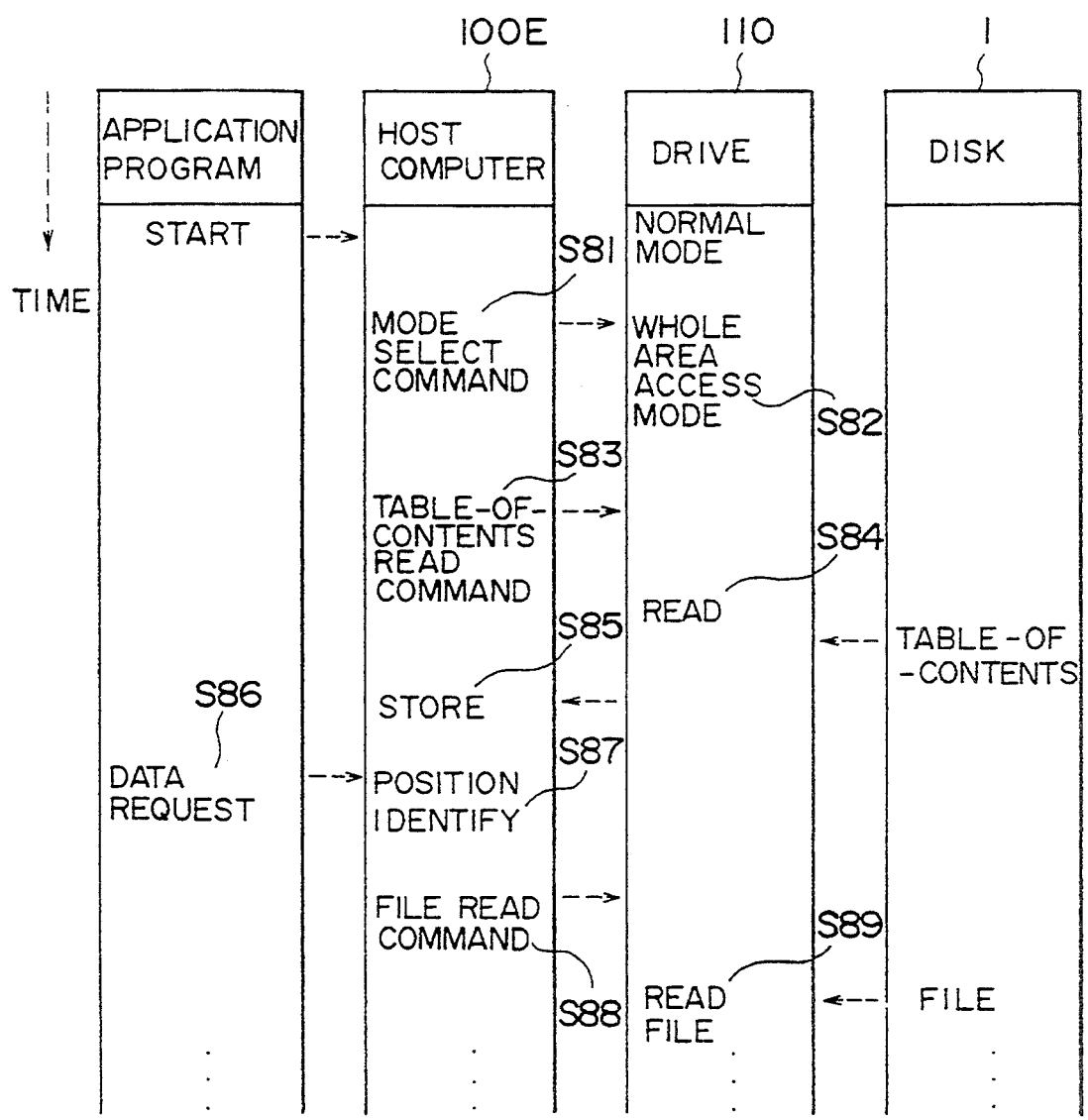
FIG. 18 is a diagram illustrating the operation of the optical disk apparatus shown in FIG. 17.

FIG. 18 is a flowchart of the operation of the system shown in FIG. 15. First, the CPU 101 (FIG. 4) of the host computer 100D starts to execute an application program installed therein and designed to record data on a disk original 88. The disk original 88 is defined as a virgin disk on which no data is recorded. Initially, all the storage area of the disk original 68 is a RAM area. In step S71 shown in FIG. 16, the write mode changing unit 51 selects a whole area access mode (maintenance mode) in which not only the user accessible area but also the user inaccessible area can be accessed. A whole area access mode signal generated by the write mode changing unit 51 is applied to an OR gate 56. Normally, the user cannot specify the selection of the whole area access mode. The whole area access mode can be specified by, for example, an application program. The host computer 100D can also specify a normal mode in which only the user accessible area can be accessed.

In step S72, the original data read unit 54 (CPU 101) reads original data OD from the external recording medium 55 via the drive 120, and writes the read original data OD into the work memory 53 formed in the RAM 103 shown in FIG. 4. The external recording medium 55 can be an optical disk (including a magneto-optical disk), or a magnetic disk. Then, the write 0 unit 52 (CPU 101) sends a write command and a write address to the OR gate 56. The write unit 52 has information concerning the format of the disk original 68. The command interpreter 66 informs the main processor 67 of receipt of the write command. The head position interpreter 62 identifies a head position to which the head 61 should be moved from the received write address, and informs the main processor 67 of information indicating the head position.

Figure 16:
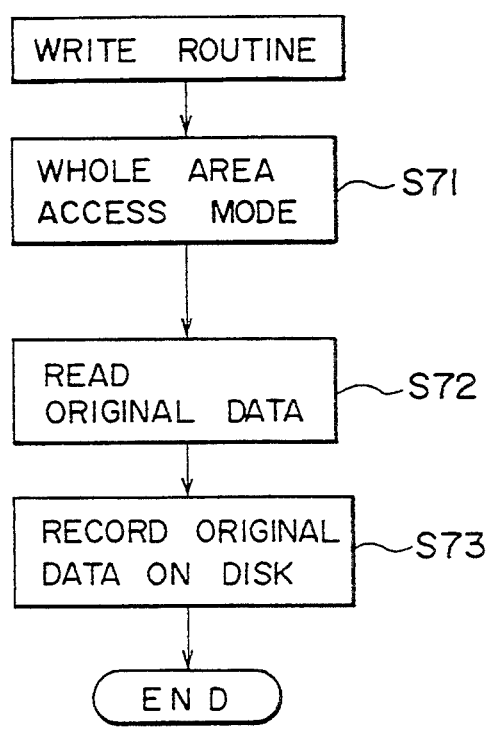
FIG. 16 is a flowchart illustrating the operation of the data writing system shown in FIG. 15.

The original data OD is transferred to the disk drive under control of the CPU 101, and is written into the data buffer 65. In response to receipt of the original data OD, the main processor 67 makes the data modulator/- demodulator unit 64 to modulate the original data OD stored in the data buffer 65. Modulated original data is then transferred to the recording/reproducing unit 63, which drives the head 61. The head 61 is moved to the specified head position under control of the main processor 67. Then, the modulated original data OD is recorded on the disk original 68. The above sequential operation after step S72 shown in FIG. 16 is performed in step S73.

According to the fourth embodiment of the present invention, data necessary to read data recorded on the user accessible area is recorded on the user inaccessible area. For example, table-of-contents data is recorded on one or both of the defect management areas (DMA) B. For example, table-of-contents data is recorded on areas (Bm areas) between sector numbers 11 and 13 on each of the tracks 1 and 9998 in the two defect management areas respectively located between tracks 0 and 2 and between 9997 and 9999 (see FIG. 2). Normally, the disk drive 110 does not use the Bm areas.

Figure 17:
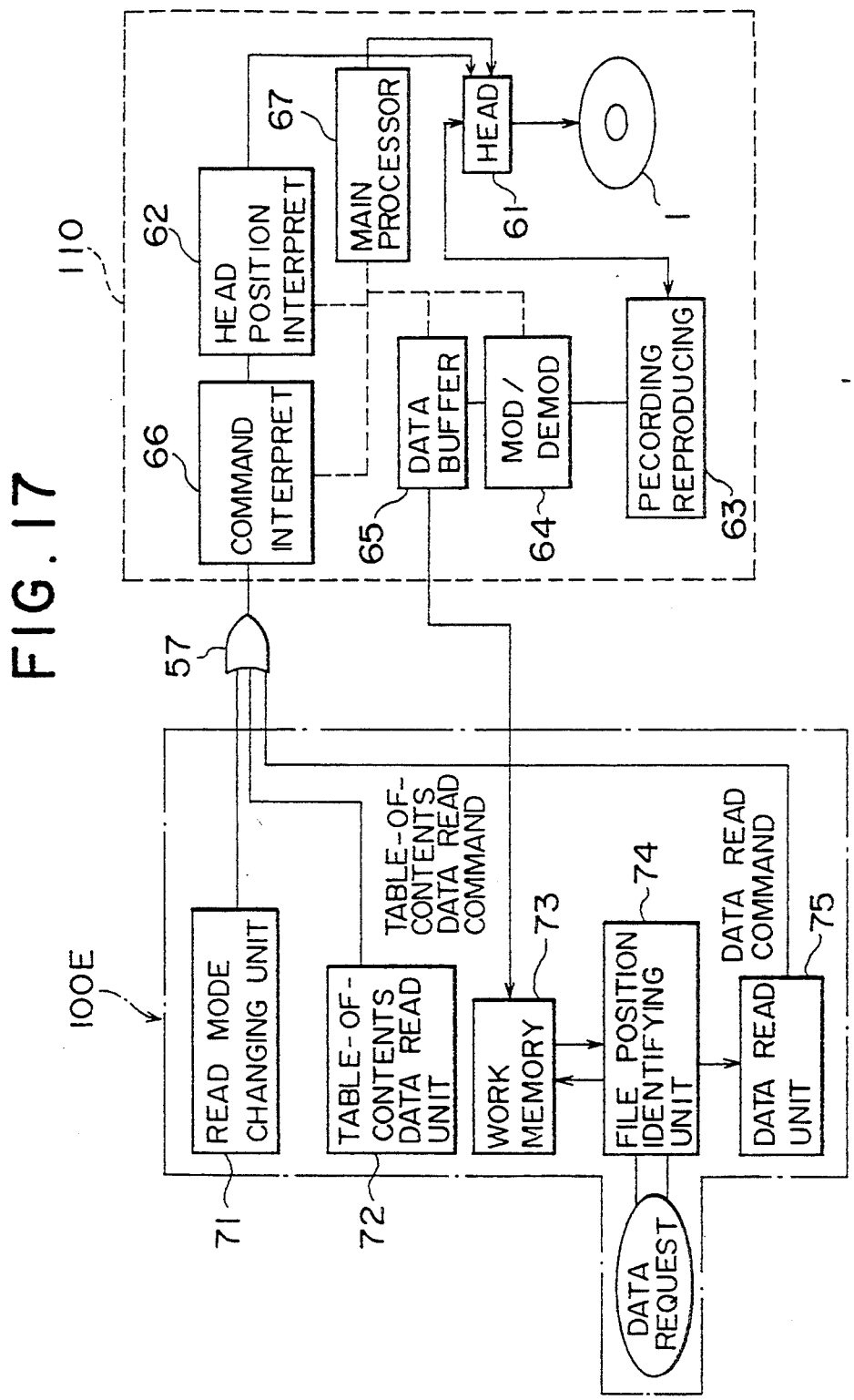
FIG. 17 is a block diagram of an optical disk apparatus according to the fourth embodiment of the present invention.

FIG. 17 is a block diagram of an optical disk data reproducing system for reading data from the optical disk 1 produced by the system shown in FIG. 15. In FIG. 17, parts that are the same as parts shown in FIG. 15 are given the same reference numbers. A host computer 100E, which has the same hardware structure as that shown in FIG. 4, includes a read mode changing unit 71, a table-of-contents data read unit 72, a work memory 73, a file position identifying unit 74, and a data read unit 75. The disk drive 110 used in the reproducing system has the same structure as that used in the data writing system shown in FIG. 15.

FIG. 18 is a diagram showing the operation of the optical disk system shown in FIG. 17 when an application program installed in the host system 100E is executed by the CPU 101 (FIG. 4).

The CPU 101 starts to execute an application program, and makes the read mode changing unit 71 change the operation mode of the disk drive 110 to the whole area access mode from the normal mode (steps S81 and S82 shown in FIG. 18). A corresponding mode changing signal generated by the unit 71 is applied to the command interpreter 66 via an OR gate 57. The CPU 101 activates the table-of-contents data read unit 72, which sends a table-of-contents data read command to the command interpreter 66 via the OR gate in step S83. The table-of-contents data read command contains address information specifying a storage area in which data necessary to read data recorded on the user accessible area is stored. For example, the table-of-contents data read command contains address information specifying the areas Bm in the defect management areas (DMA) B.

The command interpreter 66 and the head position interpreter 62 interpret the table-of-contents read command, and send interpreted information to the main processor 67. The main processor 67 activates the head 61, which optically reads table-of-contents data from the optical disk 1 in step S84. Then the read table-of-contents data is applied to the data modulator/demodulator unit 64 via the recording/reproducing unit 63. Demodulated table-of-contents data is then written into the data buffer 65, and is then transferred to the work memory 73 of the host computer 100E in step S85.

When the operator enters a command in the application program executed by the host computer 100E via the keyboard 105 (FIG. 4) to obtain desired data, the file position identifying unit 74 (CPU 101) searches for a memory area of the work memory 73 in which the desired data is stored, and informs the data read unit 78 of address information specifying the above memory area (steps S88, S87). In step S88, the data read unit 75 sends a data read command containing the above address information to the command interpreter 88 via the OR gate 57. In response to the data read command, the disk drive 110 reads the specified recording area on the optical disk 1 in step S89.

If an unlawfully produced optical disk is loaded in the optical disk drive 110, the operator cannot read desired data therefrom because the table-of-contents data recorded on the data management areas B of the true optical disk is not recorded on the unlawfully produced optical disk. In this case, the file position identifying unit 74 cannot identify the file position of the file having desired data in step S87.

As has been described above, the fourth embodiment of the present invention can be applied to optical disks in which the whole user accessible area is a RAM area (a full-RAM disk) or segmented into a RAM area and a ROM area (a partial ROM disk). In a full-ROM type optical disk, data is recorded thereon in the form of pits that are physical projections or recesses. In this case, the table-of-contents data recorded on the defect management areas B and data recorded on the user accessible area A are recorded in the form of pits by using a stamper.

Figure 19:
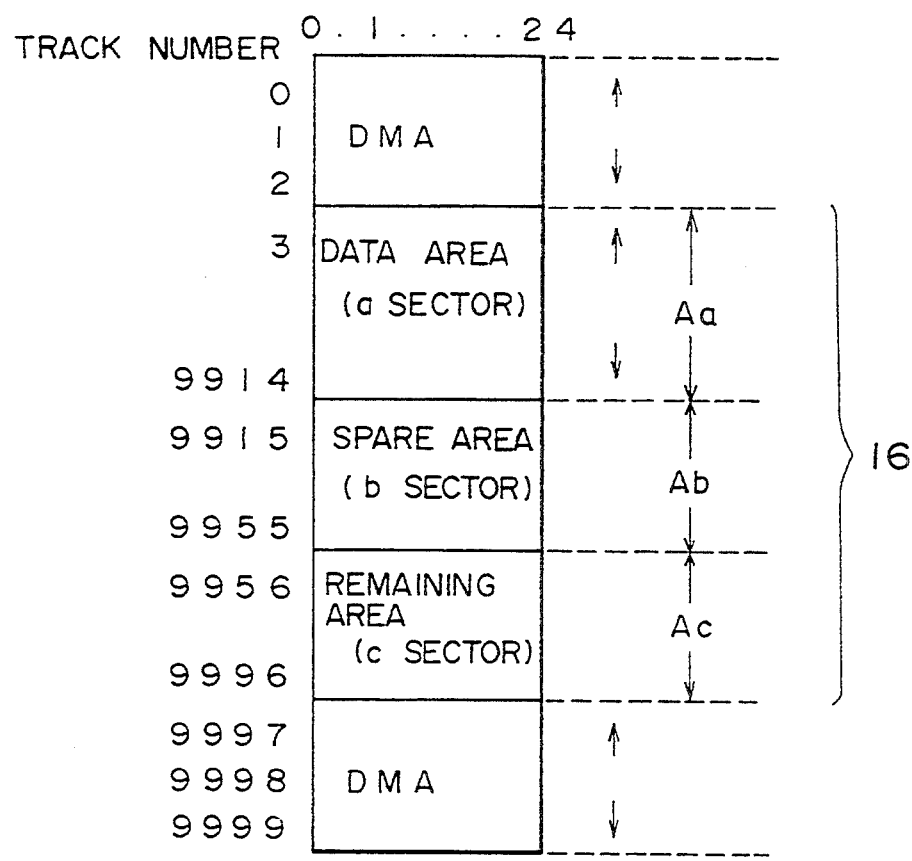
FIG. 19 is a diagram illustrating a part of the format of the optical disk.

According to the ISO standard (ISO 10090), as shown in FIG. 19, the RAM area 16 on the full-RAM disk or the partial ROM disk consists of a data area Aa, a spare area Ab and a remaining area Ac. The spare area Ab is substituted for a defective area in the data area Aa. In the normal mode, the disk drive 110 can access only the data area Aa and the spare area Ab. That is, the remaining area Ac cannot be accessed in the normal mode.

As has been described previously, the write unit 52 of the host computer 100D shown in FIG. 15 stores the format information. The format information indicates that the data area Aa consists of a sectors and the spare area consists of b sectors. The remaining sectors c in the RAM area 16 forms the remaining area Ac. The storage capacity of the RAM area 16 is equal to a+b+c.

Taking into account the above, the fourth embodiment of the present invention can be modified as follows. The write unit 52 generates the write command showing that information, which indicates the positions of files on the optical disk and is contained in the original data OD, is recorded on the remaining area Ac.

In the system shown in FIG. 17, the file position information is read from the remaining area Ac and stored in the work memory 73. The table-of-contents data read unit 72 has the additional function of generating a command that requests to read the file position information recorded on the remaining area Ac. In response to the above command, the file position information is read and written into the work memory 73. The file position identifying unit 74 refers to the content of the work memory 73 and identifies the position of the desired file specified by the operator.

The unlawfully produced optical disk does not have the file position information recorded on the remaining area Ac. Hence, it is impossible to read desired data from the unlawfully produced optical disk.

The fourth embodiment of the present invention can also be modified as follows. Address information specifying defective sectors is recorded on the aforementioned primary defect list areas Bp. In the normal mode, the areas Bp cannot be accessed. With the above in mind, specific address information is intentionally recorded on the primary defect list areas Bp.

During the production process of the optical disk, the recording surface of the optical disk is formatted according to the format shown in FIGS. 2 and 19. Next, defective sectors on the optical disk are identified and information indicating the positions of the defective sectors is recorded on the primary defect list areas Bp in the user inaccessible area. Then, one or a plurality of sectors that are not recorded on the primary defect list areas Bp is selected, and its address information indicating a storage area in which predetermined data, such as table-of-contents data, is stored, is recorded on the primary defective list .areas Bp.

The optical disk thus produced can be optically read by the system shown in FIG. 17, and data recorded thereon can be read in accordance with the procedure shown in FIG. 18. An unlawfully produced optical disk does not have the table-of-contents data recorded on the primary defect list areas Bp. Instead of the table-of-contents data, it is possible to record identification (ID) data inherent in each recording medium.

Figure 20:
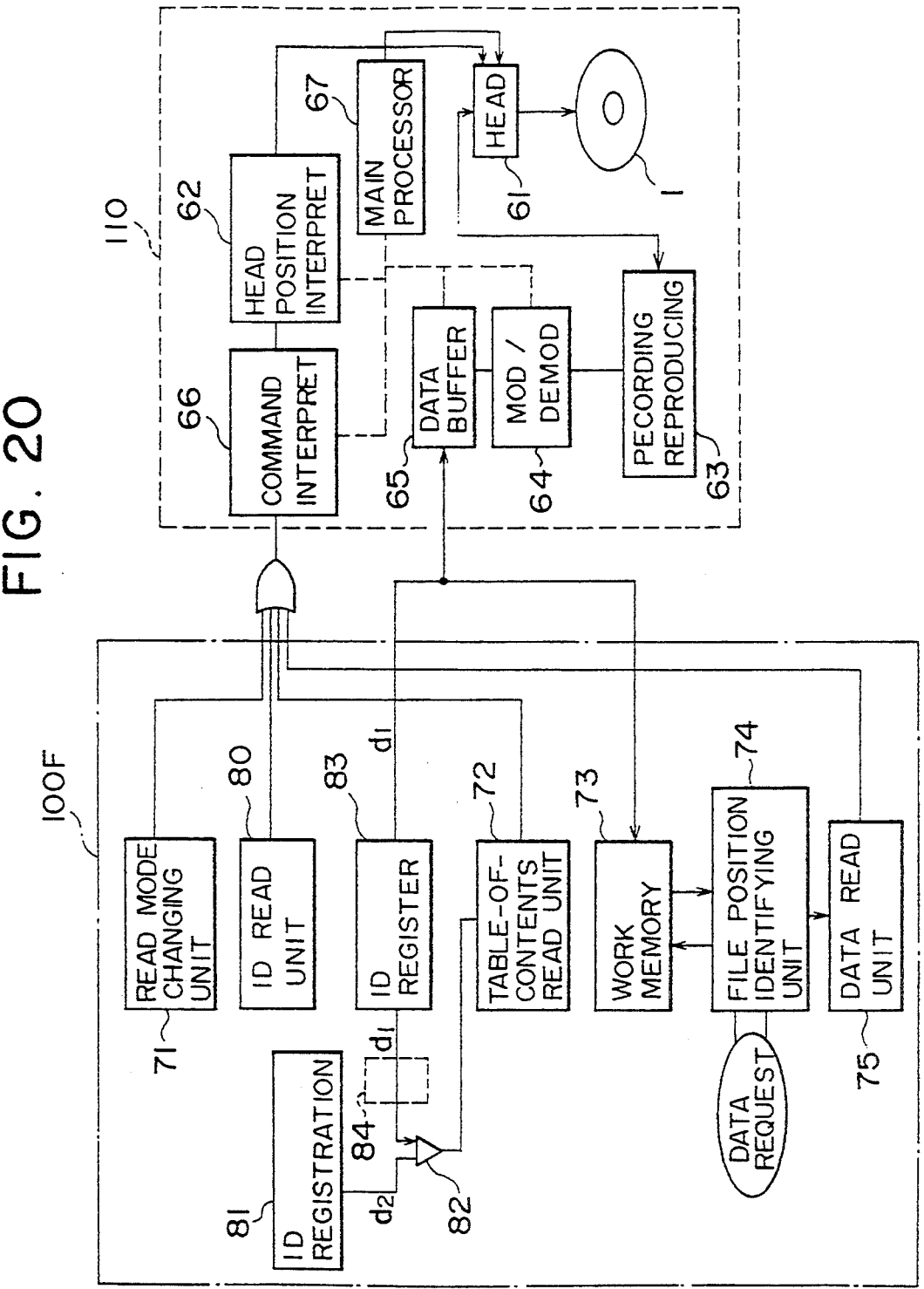
FIG. 20 is a block diagram of a modification of the fourth embodiment of the present invention.

FIG. 20 is a block diagram of an optical disk system configured by modifying the fourth embodiment of the present invention shown in FIG. 17. In FIG. 20, parts that are the same as parts shown in FIG. 17 are given the same reference numbers. The system shown in FIG. 20 is designed for the ID (identification) data inherent in each recording medium. As shown in FIG. 20, a host computer 100E includes an ID data read unit 80, an ID storage unit 81, a comparator 82, and an ID register 83. The actual hardware structure of the host computer 100E is the same as that shown in FIG. 4.

Figure 21:
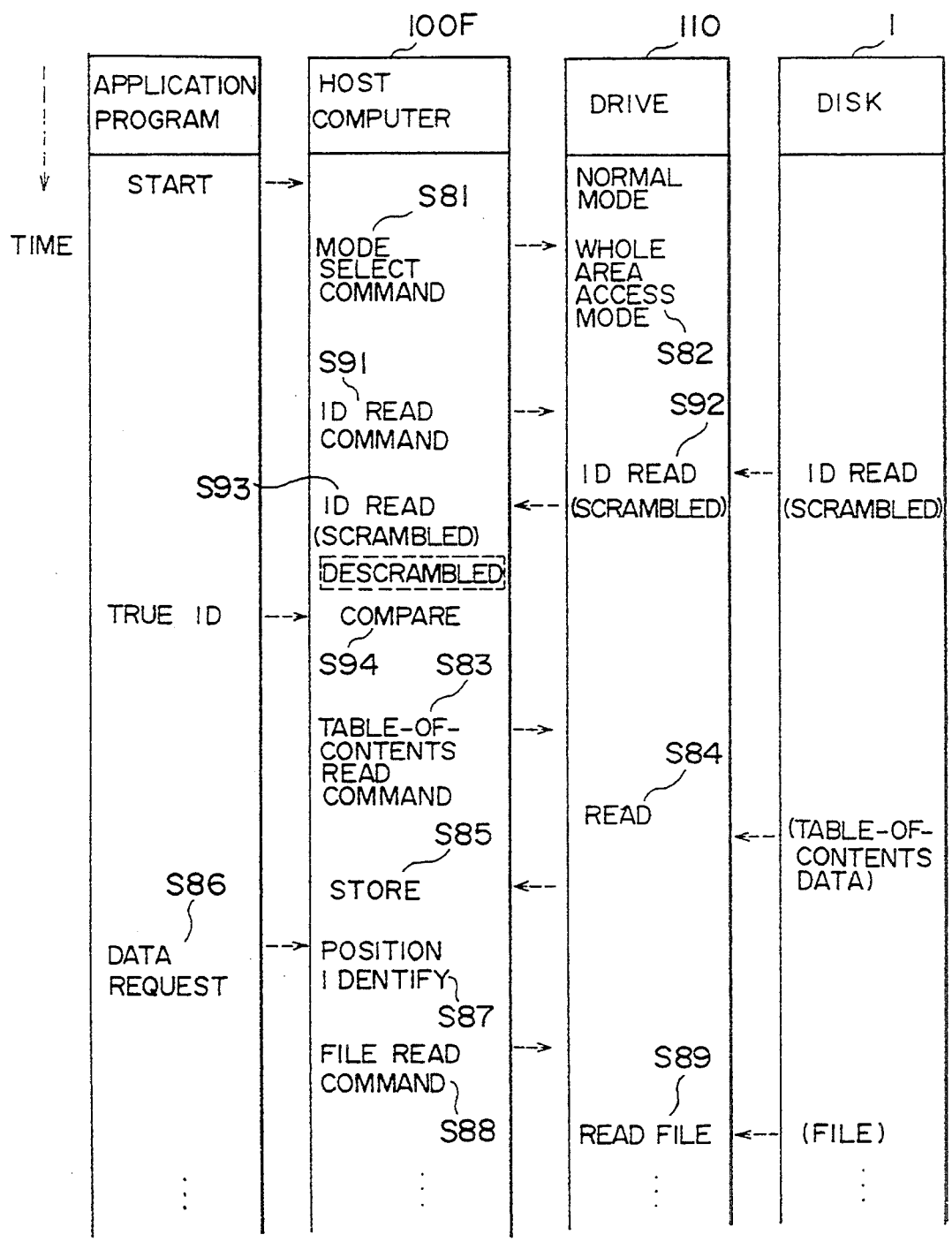
FIG. 21 is a diagram illustrating the operation of the modification shown in FIG. 20.

FIG. 21 shows the operation of the optical disk system shown in FIG. 20. The CPU 101 (FIG. 4) starts an application program, and causes the read mode changing unit 71 to change the mode from the normal mode to the whole area access mode. Then, the read mode changing unit 71 outputs the corresponding mode select command to the command interpreter 66 via an OR gate 85 in step S81. Hence, the disk drive 110 is switched to the whole area access mode. Then, the CPU 101 activates the ID read unit 84 (formed by execution of the program by the CPU 101), and outputs an ID 10 acquisition command to the command interpreter 66 via the OR gate 85 in step S91.

In response to receipt of the ID acquisition command, the disk drive 110 reads the optical disk 1 and sends back ID data d1 to the host computer 100F in step S92. Then, the ID data d1 is written into the ID register 83. Then, the CPU 101 reads true ID data d2 from in the ID storage unit 81 formed in, for example, the ROM 102 and compares the true ID data d2 with the read ID data d1 at the comparator 82 in step S94. When the ID data d1 is the same as the ID data d2, the output signal of the comparator 82 activates the table-of-contents data read unit 72. Then, the aforementioned steps S83–S89 are performed. When the ID data d1 is not the same as the ID data d2, the comparator 81 cannot activate the table-of-contents data read unit 72.

In the above-mentioned modification, there is a possibility that the ID data stored in the application program may be read. In this case, the ID data d1 read from the optical disk 1 may be the same as the ID data d2 irrespective of whether or not the optical disk is true.

Figure 22:
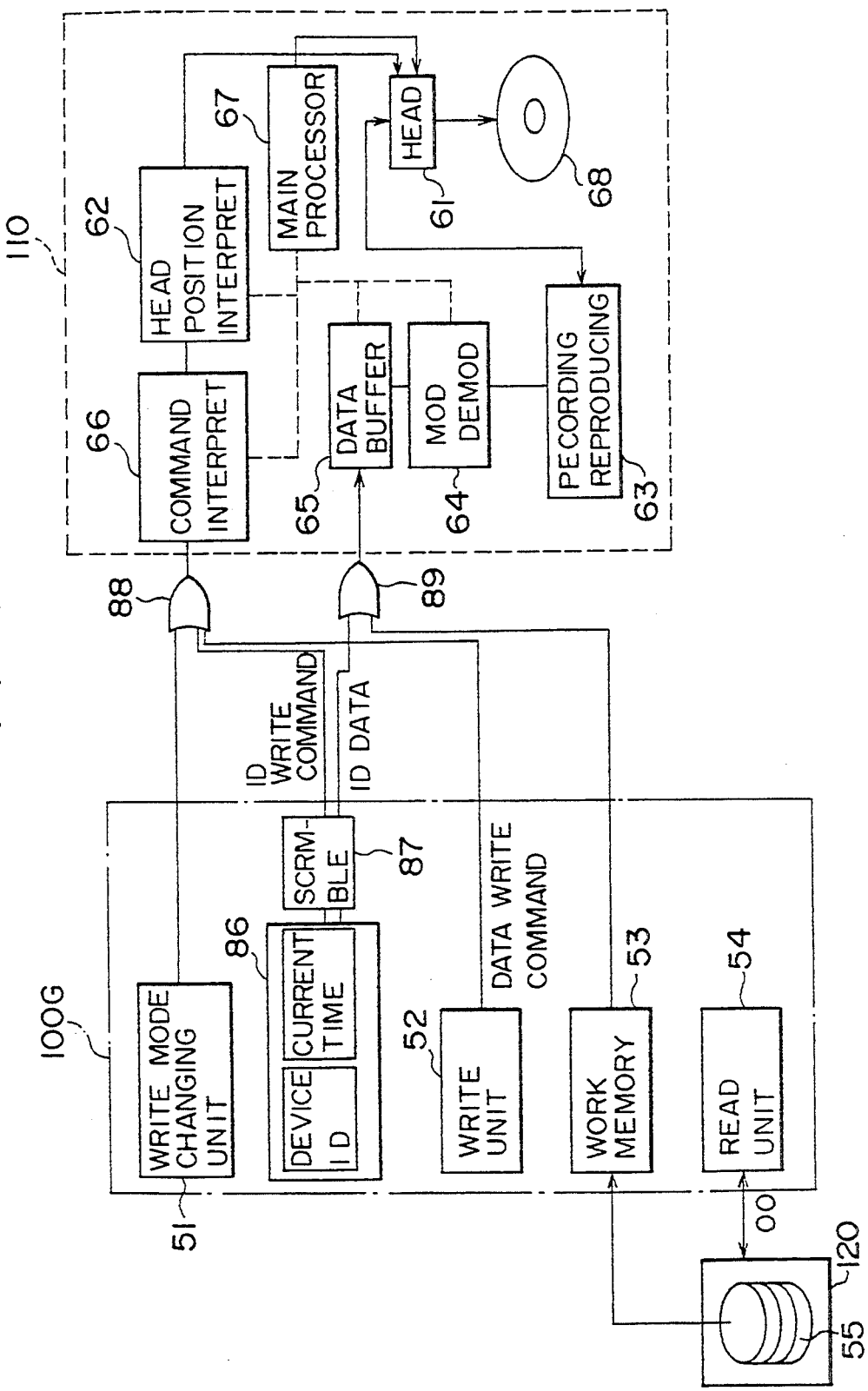
FIG. 22 is a block diagram of another modification of the fourth embodiment of the present invention.

With the above in mind, scrambled ID data is recorded on the optical disk by means of a data writing system shown in FIG. 22, in which parts that are the same as parts shown in FIG. 15 are given the same reference numbers. A host computer 100G shown in FIG. 22 has an ID generator 86 and a scrambler 87 in addition to the structural elements of the host computer 100D shown in FIG. 15.

Figure 23:
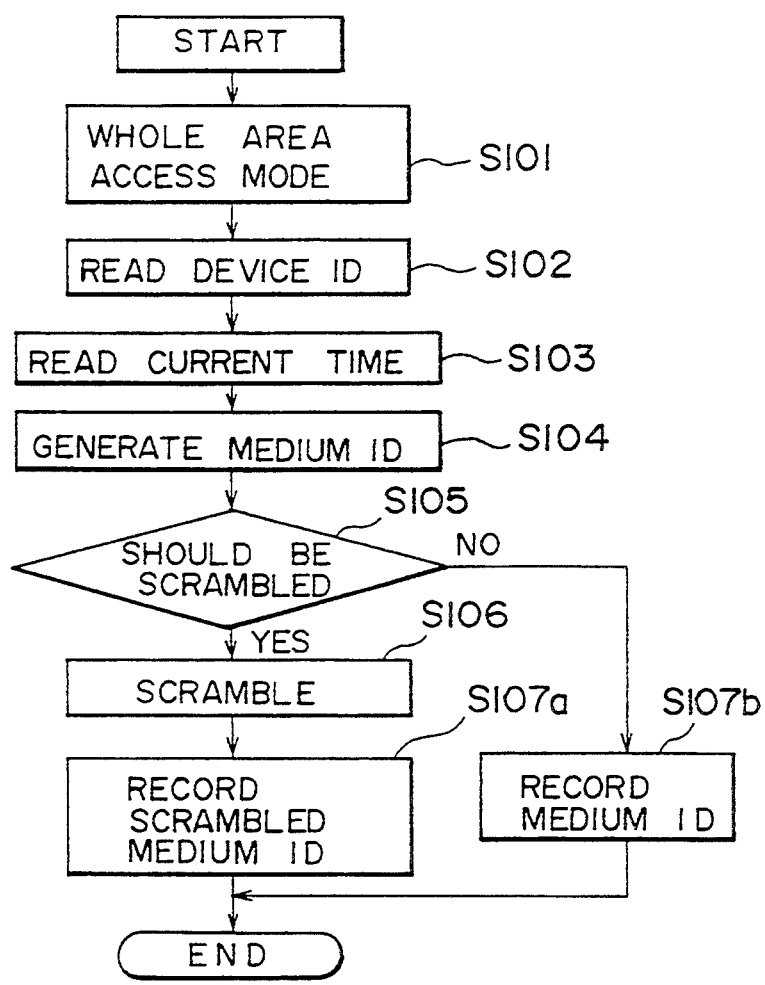
FIG. 23 is a flowchart illustrating the operation of the system shown in FIG. 22.

Referring to FIG. 23, the write mode changing unit 51 (CPU 101 shown in FIG. 4) changes the mode from the normal mode to the whole area access mode in step S101. Then, the CPU 101 makes the ID generator 86 generate ID data of the recording medium from a predetermined device ID and the current time in steps S101–S105. In step S105, the CPU 101 determines whether or not the recording medium ID should be scrambled according to an instruction from the operator input by the keyboard 105 (FIG. 4). When the result of step S105 is NO, the ID data generated by the ID generator 86 is sent to the data buffer 65 via an OR gate 89. The ID generator 86 also generates an ID write command, which is sent to the command interpreter 66 via an OR gate 88. In step S107b, the ID data is recorded on, for example, one of the defect management areas B in response to the ID write command.

When it is determined, in step S105, that the ID data should be scrambled, the CPU 101 makes the scramble unit 87 scramble the ID data generated by the ID generator 86 in step S106. Then, the scrambled ID data is written into the data buffer 65 via the OR gate 89. In step S107a, the scrambled ID data is recorded on, for example, one of the defect management areas B in response to the ID write command.

In order to descramble the scrambled ID data, as shown in FIG. 20, a descrambler 84 is provided between the ID register 83 and the comparator 82. The scrambled ID data is read from the ID register 83 and is then descrambled by the descrambler 84. The descrambler 84 is formed by software of the application program. The ID storage unit 81 stores the true ID data d2. When the optical disk is true, the ID data d1 from the descrambler 84 is the same as the ID data d2.

Figures 24, 25:
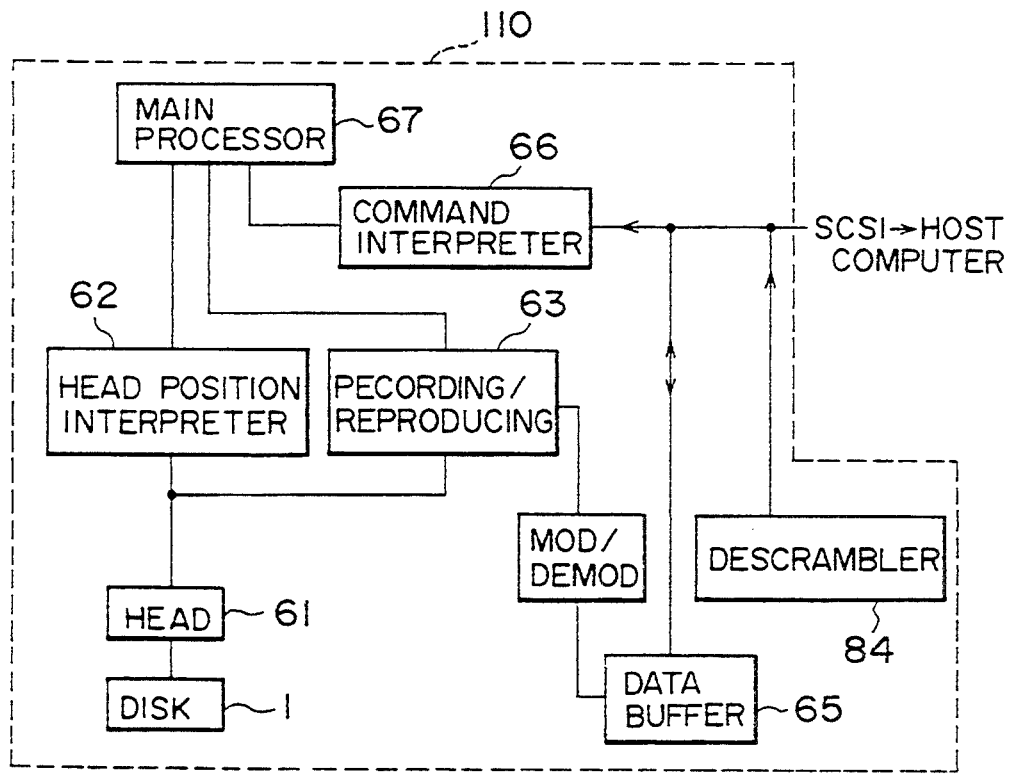
FIG. 24 is a block diagram of a variation of the system shown in FIG. 22.
FIG. 25 is a diagram illustrating the structure of sectors.

It is also possible to provide the descrambler 84 in the optical disk drive 110, as shown in FIG. 24. The descrambler 84 in the optical disk drive 110 can be formed by software or hardware. The scrambled ID data read from the optical disk 1 and written into the data buffer 65 is descrambled by the descrambler 84. Then, the descrambled ID data is transferred to the ID register 83.

The ID data is not limited to the above-mentioned ID data. For example, the ID data can be simple flag data. In the above-mentioned embodiments of the present invention, data (ID data, for example) necessary to read desired data from the user accessible area is recorded on the user inaccessible area that cannot be accessed in the normal mode. However, it is possible to record the ID data on the user accessible area by using an error correction code (ECC) recorded on a sector area accessible in the normal mode.

Normally, as shown in FIG. 25, a data field Ad in each sector is followed by an ECC area Ae into which ECC data corresponding to the data field Ad can be written. The ECC data is automatically computed from data written into the corresponding data field Ad when the above data is written into the corresponding field Ad. Normally, taking into account a case where data error is not completely corrected by the ECC data, a parity sector is provided in each track. Correction data relating to all data stored in the sectors in the track is written into the parity sector provided in the above track.

Figure 26:
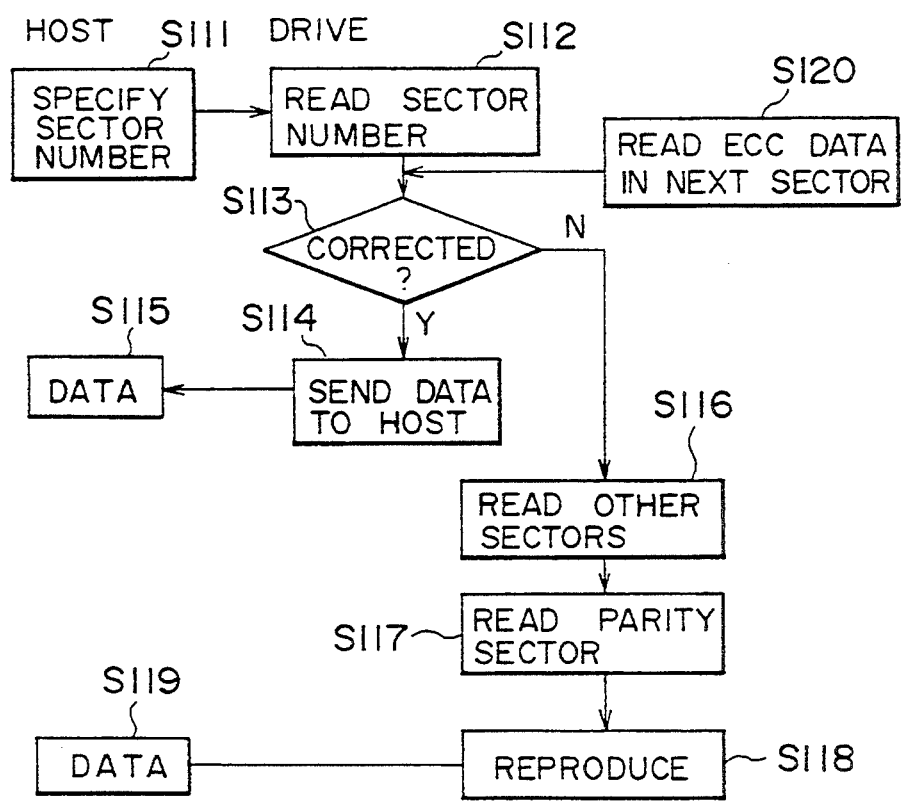
FIG. 26 is a flowchart showing how an error in data is corrected.

FIG. 26 is a flowchart of a data correction procedure executed when data is read from the optical disk. The host computer (CPU 101) specifies a sector number in step S111. In response to the specified sector number, the disk drive (the main processor 67) reads the specified sector in step S112. When there is no data error or data errors are corrected by referring to the ECC, the disk drive sends back data recorded on the specified sector to the host computer in step S114.

In step S115, the host computer writes the received data into the RAM 103. When it is determined, in step S113, that errors cannot be corrected, the disk drive reads the sectors of the same track in step S116, and reads the parity sector located on the same track in step S117. In step S118, the disk drive generates correct data by referring to data read from the other sectors and the parity data read from the parity sector. In step S119, the host computer writes the data corrected in step S118 into the RAM 103. If a data error cannot be completely corrected after step S118, reading of data recorded on the sector being considered is prevented.

With the above in mind, as shown in FIG. 25, the table-of-contents data is written into the data field Ad of a specific sector, and arbitrary data (FFh in FIG. 25; h is the hexadecimal notation) which is not related to the table-of-contents data is intentionally written into the corresponding ECC field Ae of the specific sector. The ECC data which should have been originally written into the ECC field Ae is written into the data field Ad of the sector subsequent to the above specific sector. Hereinafter, the above ECC data is referred to as hidden ECC data. Normally, one sector has a 512-byte storage capacity, and the ECC data consists of 80 bytes. Further, data FFh is stored in the data field Ad of the subsequent sector, as shown in FIG. 25.

Figure 27:
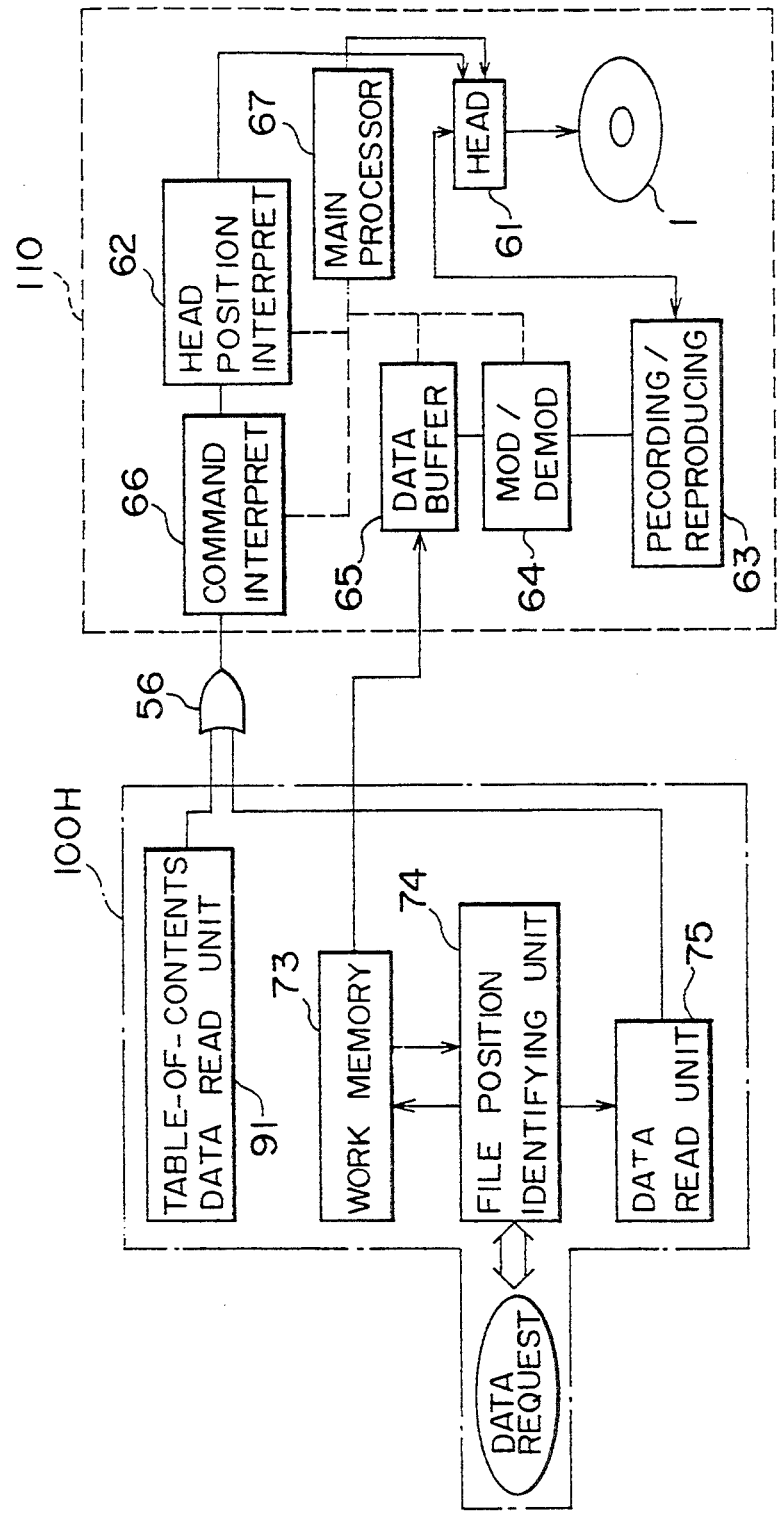
FIG. 27 is a block diagram of a fifth embodiment of the present invention.

FIG. 27 is a block diagram of an optical disk system according to a fifth embodiment of the present invention capable of reading data from an optical disk having the sector structure shown in FIG. 25. In FIG. 27, parts that are the same as parts shown in the previously described figures are given the same reference numbers. A host computer 100H shown in FIG. 27 includes a table-of-contents data read unit 91 together with the work memory 73, the file position identifying unit 74, and the data read unit 75. The actual hardware structure of the host computer 100H is the same as that shown in FIG. 4.

After an application program is started, the table-of-contents data read unit 91 specifies the specific sector, in which the table-of-contents data is stored, in step S111 in FIG. 26. The disk drive 110 (more specifically, the main processor 67) reads the table-of-contents data stored in the data field Ad of the specific sector, and the hidden ECC data stored in the data field Ad of the next specific sector subsequent to the specific sector in steps S112 and S120. Then, the disk drive 110 executes step S113.

Unlawfully produced optical disks do not have information catering for the function of step S120 shown in FIG. 26. Hence, the disk drive executes a process for correcting the table-of-contents data in the data field Ad of the specific sector according to data stored in the ECC field Ae thereof. However, data stored in the ECC field Ae of the specific sector is not related to the table-of-contents data in the data field Ad thereof.

Hence, the table-of-contents data in the data field Ad of the specific sector cannot be corrected by the data stored in the ECC field Ae thereof. It is also impossible to correct the table-of-contents data by the correction data in the parity sector located in the same track as the specific sector. Hence, data obtained in step S119 shown in FIG. 26 is corrupted by the error correction in step S118 and is therefore meaningless data. That is, the table-of-contents data cannot be correctly read, and the unlawfully produced optical disk cannot be used.

Figure 28:
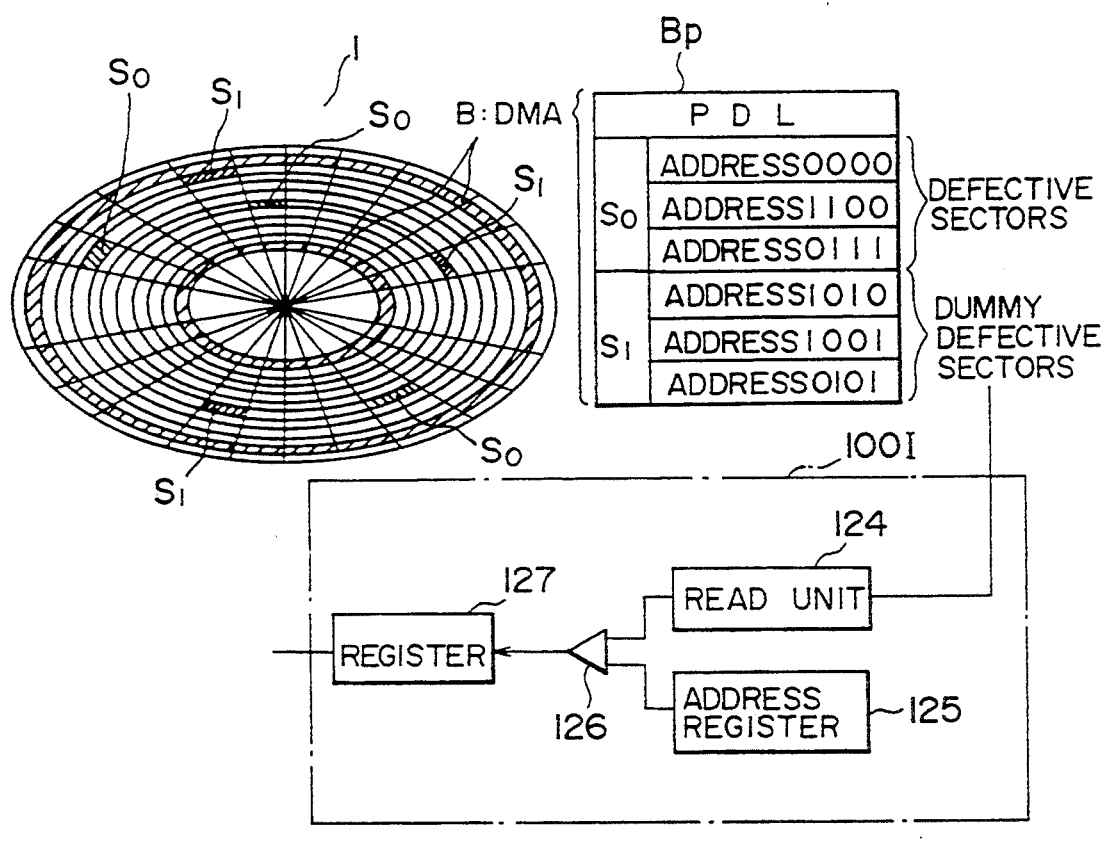
FIG. 28 is a block diagram of a sixth embodiment of the present invention.

A description will now be given of a sixth embodiment of the present invention. As shown in FIG. 28, the optical disk 1 has defective sectors S0 and dummy defective sectors S1. These dummy defective sectors S1 are intentionally formed on the recording surface of the original optical disk 68. Address information indicating the positions of the defective sectors S0 and the dummy defective sectors S1 is recorded on the primary defect list (PDL) areas Bp in one or both of the defect management areas B. A host computer 100I includes a read unit 124, an address register 125, a comparator 126 and a register 127. The address register 125 stores address information indicating the positions of the dummy defective sectors S1.

Data recorded on the defect management areas B cannot be copied onto another optical disk in the normal access mode. Hence, the unlawfully produced optical disk does not have address information indicating the positions of the dummy defective sectors S1. The defect management areas B are read, and address information recorded on the primary defect list areas Bp is read by the read unit 124 in the whole access mode. The comparator 126 compares the read address information with the address information stored in the address register 125. When the addresses of all the dummy defective sectors S1 coincide with the addresses registered in the address register 125, it is determined that the optical disk 1 is true. The result of the comparison is stored in the register 127.

Figure 29:
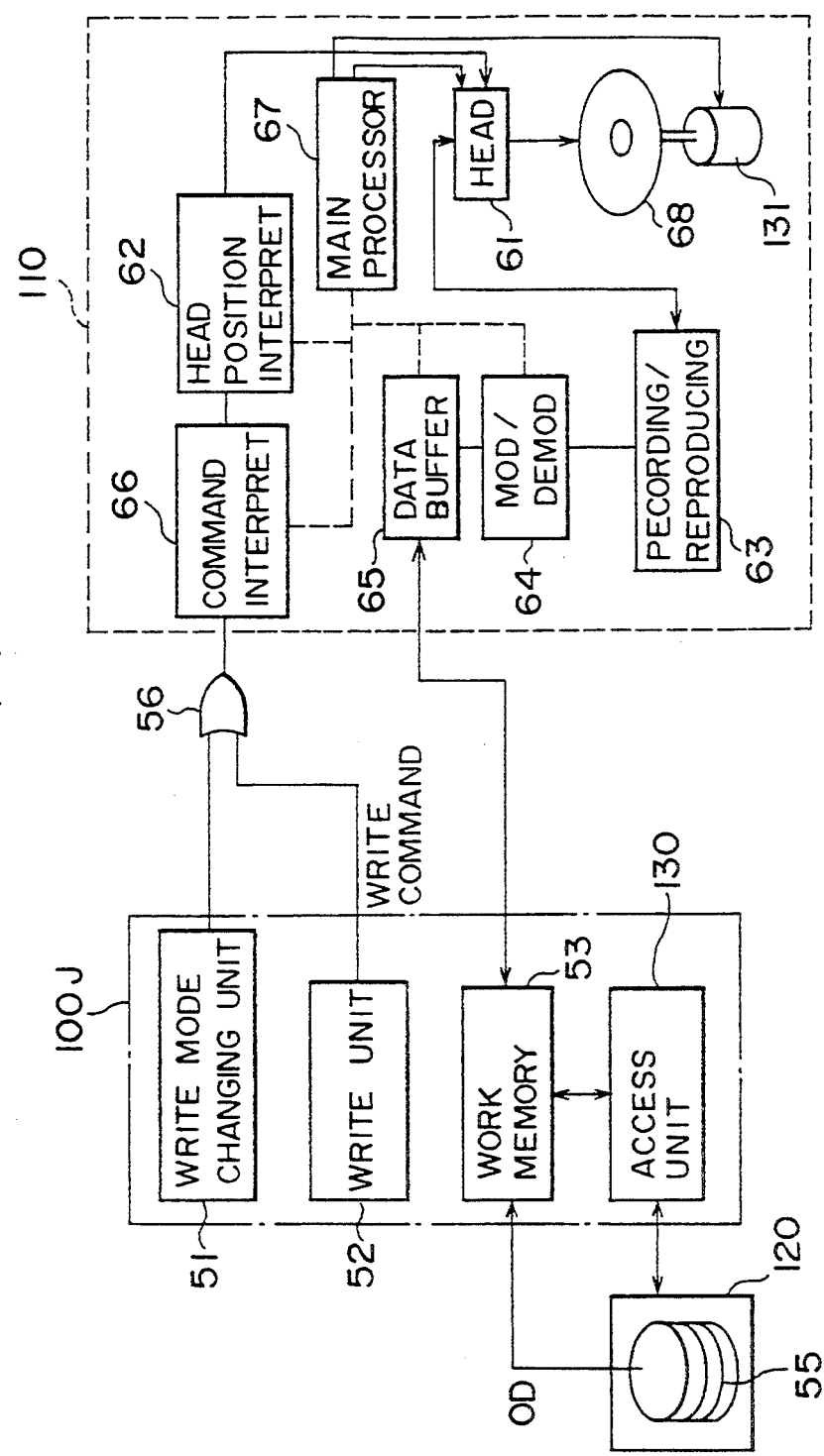
FIG. 29 is a block diagram of a data writing system used in the sixth embodiment of the present invention.

FIG. 29 is a block diagram of a data writing system used in the sixth embodiment of the present 0 invention. In FIG. 29, parts that are the same as parts shown in the previously described figures are given the same reference numbers. A host computer 100J includes the write mode changing unit 51, the write unit 52, the work memory 53 and a work memory access unit 130. As has been described previously with reference to FIG. 15, the write unit 52 stores format information as shown in FIGS. 2 and 19. The write unit 52 sequentially outputs commands to the disk drive 110, so that the disk original 68 is formatted by using original data OD read from the external recording medium 55 read via the drive 120. In actuality, the structural elements 51, 52, 53 and 130 are realized by the CPU 101 (FIG. 4), and are therefore connected to each other.

Figure 30:
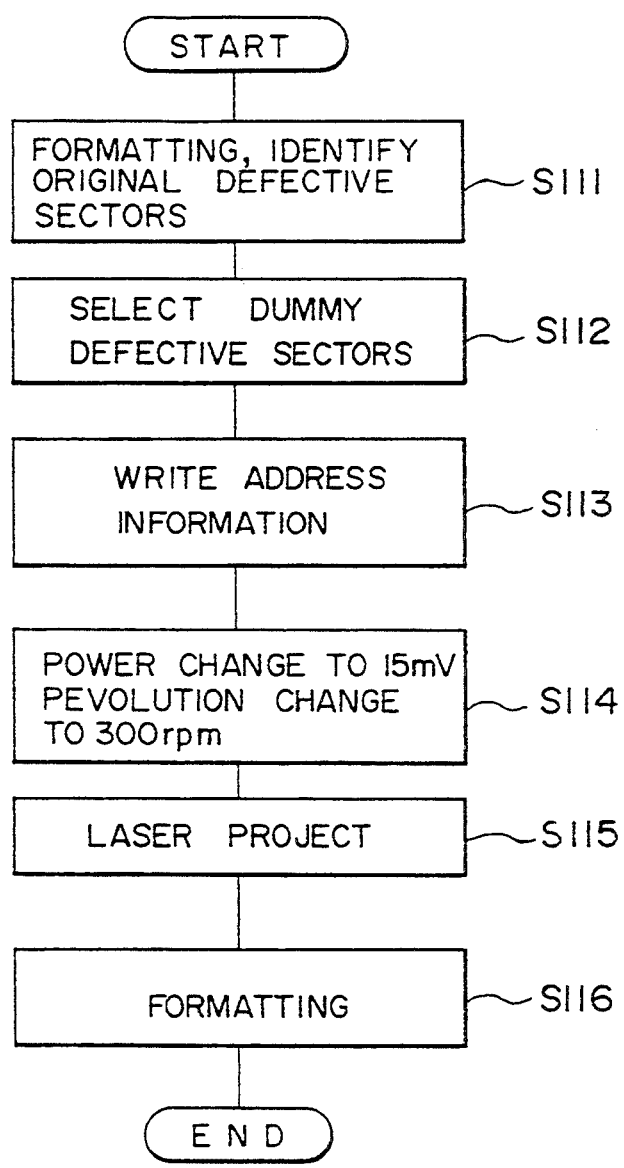
FIG. 30 is a flowchart illustrating the operation of the system shown in FIG. 29.

FIG. 30 is a flowchart of the operation of the data writing system shown in FIG. 29. In step S111, the above-mentioned formatting process is carried out, and then the drive unit 110 reads the disk original 68 and sends read information to the work memory 53 shown in FIG. 29. The CPU 101 (FIG. 4) reads the read information stored in the work memory 53 by means of the access unit 130, and identifies defective sectors S0. Then, the CPU 101 sends the write command to the disk drive 110 via the write unit 52 and sends address information indicating the positions of the defective sectors from the work memory 53 to the data buffer 65. The command interpreter 66 interprets the received write command which is a request to record the address information concerning the defective sectors SO on the primary defect list areas Bp. Further, the head position interpreter 62 identifies the head position to which the head 61 should be moved. Under the control of the main processor 67, the address information is applied to the head 61 via the data modulation/demodulation unit 64 and the recording/reproducing unit 63. Then, the address information is recorded on the primary defect list areas Bp.

In step S112, the CPU 101 determines one or a plurality of dummy defective sectors S1 other than the defective sectors SO by referring to, for example, a table of random numbers stored in the ROM 102 (FIG. 4). In step S113, the CPU 101 stores address information indicating the positions of the dummy defective sectors S1. The address information is registered in an application program.

Then, the write unit 52 outputs a dummy sector address information writing command to the command interpreter 66 via the OR gate 56. The command interpreter 66 interprets the received command, and the head position interpreter 62 identifies the head position to which the head 61 should be moved. The head position corresponds to the primary defect list area Bp. Then, the address information indicating the dummy defective sectors is transferred to the data buffer 65 under the control of the CPU 101.

The main processor 67 is informed of receipt of the dummy sector address information writing command, and increases power to be supplied to a laser element of the head in order to record the dummy defective sectors in step S114. For example, the power to be supplied to the laser element is switched from 9 mW to 15 mW. In addition, the main processor 67 controls an optical disk driving unit 131 so that the rotation velocity of the disk original 68 is changed from 3000 rpm to 300 rpm in step S114. Under these conditions, the laser beam emitted from the head 61 is projected onto the disk original 68 in step S115. Thereby, the corresponding recording surface is altered and the dummy defective sector S1 is formed. In step S116, the address information indicating the positions of the dummy defective sectors S1 is recorded on the primary defect list areas Bp.

An optical disk data playback system for reproducing data from the optical disk produced in the above-mentioned manner includes the aforementioned host computer 100I shown in FIG. 28 and the optical disk drive 110 (not shown in FIG. 28 for the sake of simplicity). Further, the host computer 100I includes the aforementioned read mode changing unit 71 shown in FIG. 17 (unit 71 is not illustrated in FIG. 28 for the sake of simplicity). The hardware structure of the host computer 100I is the same as that shown in FIG. 4.

Figure 31:
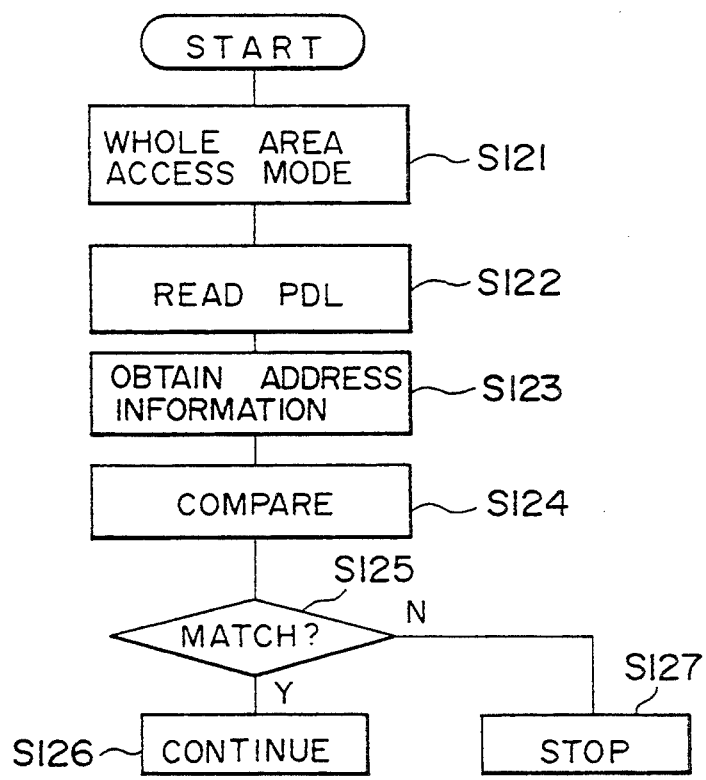
FIG. 31 is a flowchart illustrating the operation of the sixth embodiment of the present invention.

FIG. 31 is a flowchart of the operation of the above optical disk data reproducing system. In step S121, the mode is switched from the normal mode to the whole area access mode in the aforementioned manner. The read unit 124 reads the primary defect list areas Bm in one or both of the defect management areas B in step S122, and obtains the address information indicating the dummy defective sectors S1 in step S123. Then, the CPU 101 compares the read address information with the address information stored in the address register 125 in step S124, and determines whether of not the read address information coincides with the registered address information in step S125. When the result of step S125 is YES, an application program is executed in step S126. When the result of step S125 is NO, the application process is not executed in step S127.

The address information indicating the defective sectors SO and the dummy defective sectors S1 cannot be copied onto another optical disk in the normal mode because the address information is recorded on the user inaccessible recording area. Hence, the result of step S125 shown in FIG. 31 is NO when the unlawfully produced optical disk having no address information concerning the dummy defective sectors S1 is read.

The dummy defective sectors S1 can be formed on not only the RAM area 16 but also the ROM area 15 (FIG. 2). When the dummy defective sectors S1 are formed in the RAM area 16, it is possible to produce optical disks having the same contents but different patterns of dummy defective sectors S1. When the dummy defective sectors S1 are formed in the ROM area 15, optical disks produced using a stamper have the same pattern of dummy defective sectors S1.

Figure 32:
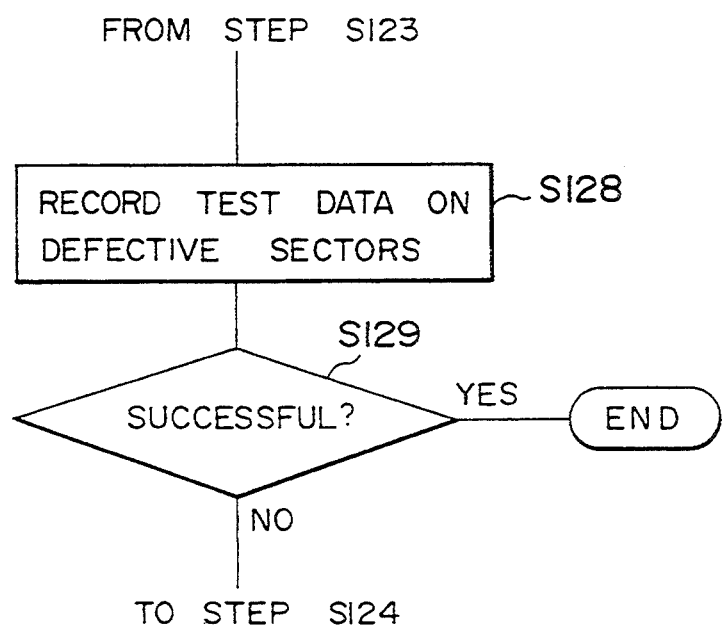
FIG. 32 is a flowchart of a modification of the sixth embodiment of the present invention.

In order to improve reliability of the disk check operation according to the sixth embodiment of the present invention, it is possible to employ a procedure shown in FIG. 32. A sequence of steps S128 and S129 is executed between the steps S123 and S124 shown in FIG. 31. In step S123, the defective sectors SO and the dummy defective sectors S1 are identified. In step S128, test data is recorded on the defective sectors SO and S1. When the optical disk 1 being processed is true, the recording operation in step S128 fails. That is, the test data cannot be recorded on any of the defective sectors SO and S1. If the optical disk 1 being processed is not true, it will be possible to record test data on some or all of the defective sectors SO and S1. The above determination operation is executed in step S129.

A description will now be given of a seventh embodiment of the present invention. The seventh embodiment of the present invention is intended to determine whether or not the optical disk is true by referring to the relationship between the number of sectors (blocks) in the data area Aa (FIG. 19) and the number of sectors (blocks) in the spare area Ab.

Figure 33A:
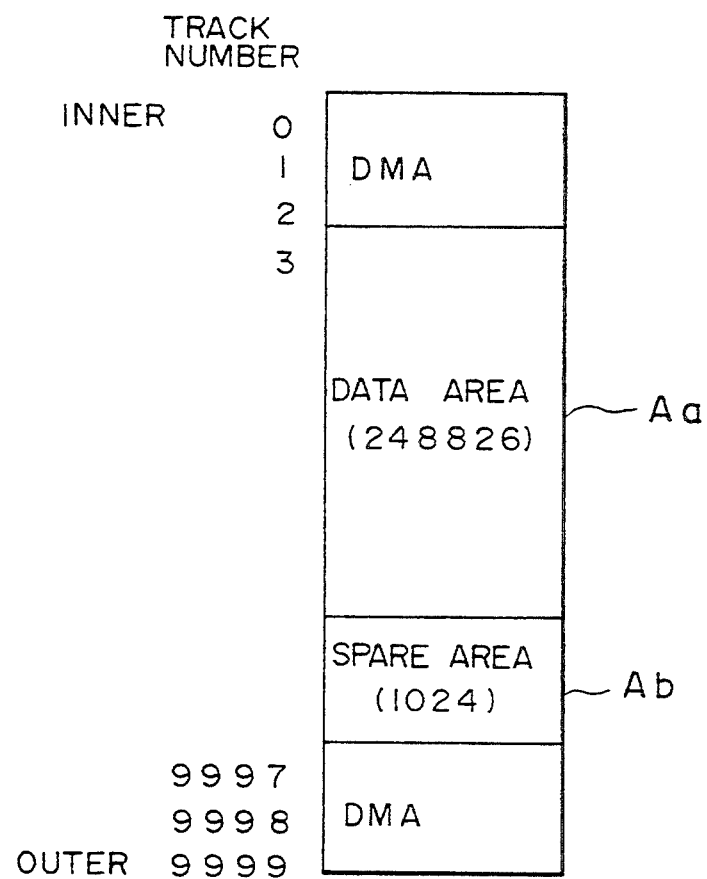
FIGS. 33A and 33B are diagrams of a recording area of an optical disk.

As has been described previously with reference to FIG. 19, it is possible to form the data area Aa and the spare area Ab between the track 0 and the track 9996 according to the ISO 10090 standard. When the remaining area Ac is not provided, the data area Aa and the spare area Ab are provided, as shown in FIG. 33A. The maximum number of sectors in the data area Aa is determined by subtracting the number of sectors in the spare area Ab from the number of sectors in the data area A. Normally, the spare area Ab includes 1024 sectors. In that case, 238826 sectors can be arranged in the data area Aa.

Figure 33B:
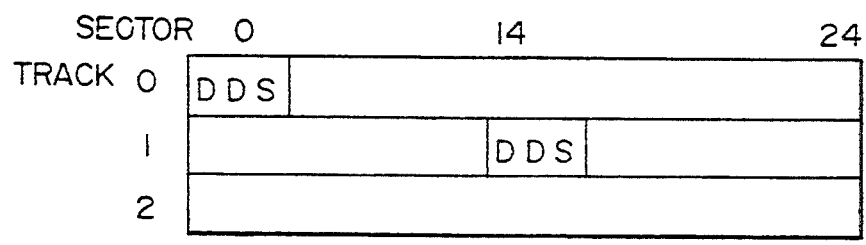

As shown in FIG. 33B, the defect management area DMA located in the inner portion of the optical disk has disk definition sectors DDS on which file management information necessary for disk management is recorded. The disk definition sectors DDS are formed in the defect management area DMA located in the outer portion of the optical disk. According to the ISO 10090 standard, information concerning the number of sectors actually arranged in the data area Aa except for defective sectors and the number of sectors arranged in the spare area Ab is recorded on the disk definition sectors DDS.

According to the seventh embodiment of the present invention, the number of sectors arranged in the data area Aa is selected so as to be different from a normally used value (equal to 238826 sectors). For example, the data area Aa is determined so that it consists of 246990 sectors. In this case, the spare area Ab consists of 2860 sectors.

The information indicating the number of sectors in the data area Aa is recorded on the disk definition sectors DDS by means of the system shown in FIG. 15.

FIG. 34 shows the disk definition sectors DDS. As shown in FIG. 34, information indicating the number of sectors in the data area Aa and information indicating the number of sectors in the spare area Ab are recorded on the disk definition sectors DDS. In this case, about 100 sectors (approximately equal to 0.05 MB) are used to record the above information.

Figure 35:
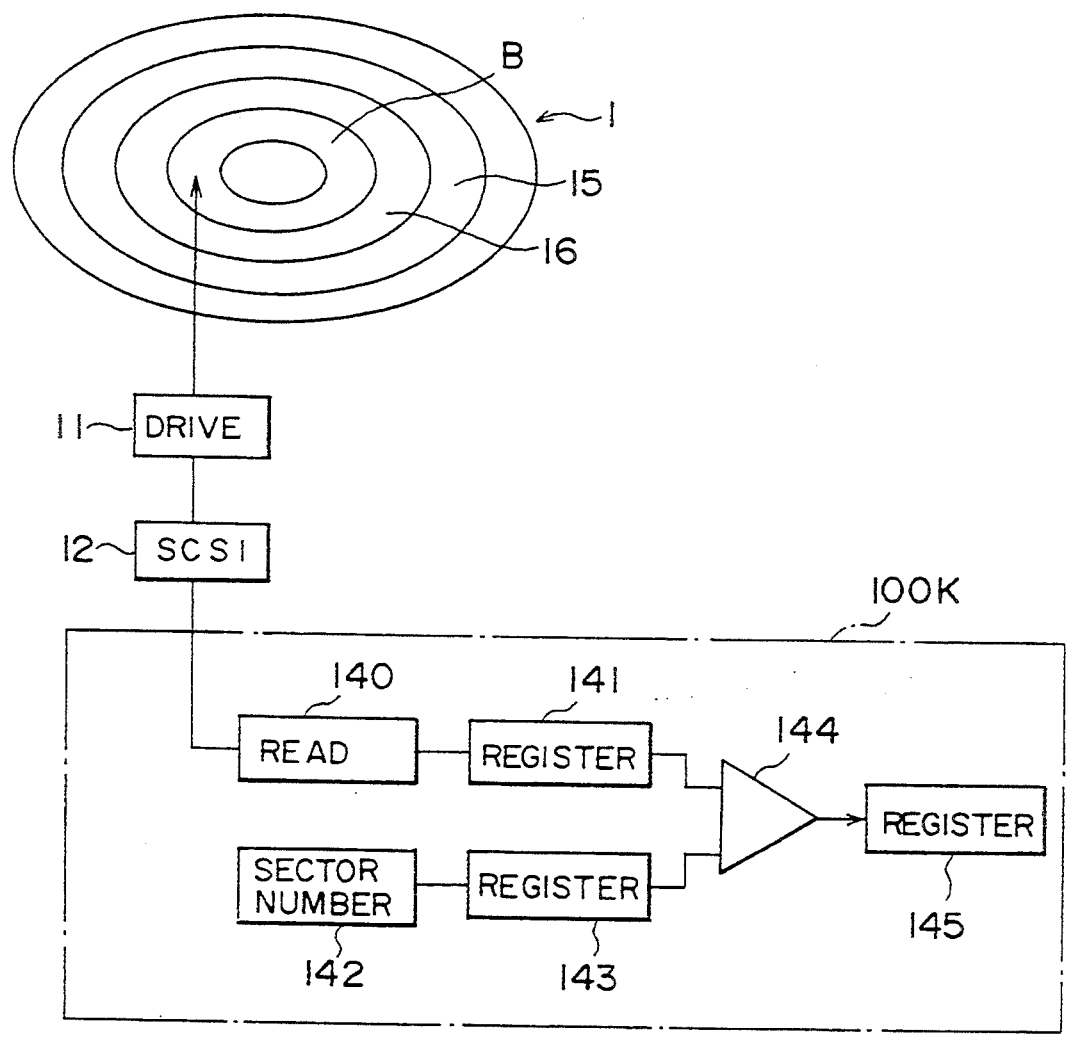
FIG. 35 is a block diagram of the seventh embodiment of the present invention.

FIG. 35 is a block diagram of an optical disk data reproducing system according to the seventh embodiment of the present invention. A host computer 100K is made up of a read unit 140, a register 141, a sector number storage unit 142, a register 143, a comparator 144 and a register 145. The actual hardware structure of the host computer 100K is the same as that shown in FIG. 4.

The read unit 140 reads information recorded on the disk definition sectors DDS and obtains information indicating the number of sectors in the data area Aa. The read information is applied to the comparator 144 via the register 141. The sector number storage unit 142 stores information indicating the number of sectors in the data area Aa of the true optical disk. The information stored in the unit 142 is applied to the comparator 144 via the register 143.

When the optical disk 1 is true, the 10 comparator 144 determines that the number of sectors in the data area Aa of the optical disk 1 is equal to the number of sectors stored in the unit 142. Then, the comparator 144 writes corresponding flag data into the register 145. If the optical disk 1 is not true, it does not have the same number of sectors in the data area Aa as that stored in the sector number storage unit 142. In this case, the comparator 144 determines that the number of sectors in the data area Aa of the optical disk 1 is different from the number of sectors stored in the unit 142, and writes corresponding flag information into the register 145. Then, execution of the application program is prevented.

The present invention is not limited to the specifically disclosed embodiments, and variations and modifications may be made without departing from the scope of the present invention.

What is claimed is:

1. A method for preventing unauthorized use of a recording medium having a user accessible area and a user inaccessible area which can be accessed in an operational mode unusable by said user the method comprising the steps of:
   (a) reading first information from the user inaccessible area of the recording medium;
   (b) comparing the first information with second information concerning a true recording medium; and
   (c) concluding that the recording medium is the true recording medium when the first information matches the second information.

2. The method as claimed in claim 1, wherein:
   the first information indicates a storage capacity of a rewritable area in the user accessible area; and
   the second information indicates a storage capacity of the rewritable area of the true recording medium.

3. The method as claimed in claim 1, wherein:
   the first information indicates a position of a dummy defective sector formed on the recording medium; and
   the second information indicates a position of the dummy defective sector formed on the true recording medium.

4. The method as claimed in claim 3, wherein the dummy defective sector is formed on a rewritable area in the user accessible area.

5. The method as claimed in claim 1, wherein:
   the first information indicates a number of sectors in a data area in the user accessible area which also has a spare area; and
   the second information indicates a number of sectors in the data area in the user accessible area of the true recording medium.

6. The method as claimed in claim 1, wherein the recording medium is an optical disk.

7. The method as claimed in claim 1, wherein the recording medium is a IC card.

8. The method as claimed in claim 1, wherein the second information is stored in an application program.

9. The method as claimed in claim 1, further comprising the step (d) of executing the step (a) immediately after execution of an application program is started.

10. The method as claimed in claim 1, further comprising the step (d) of executing the step (a) when an application program needs data stored on the recording medium.

11. A method for preventing unauthorized use of a recording medium having a user accessible area and a user inaccessible area which can be accessed in an operational mode unusable by said user the method comprising the steps of:
    (a) reading first information from a storage portion of a read only area in the user inaccessible area, which can be accessed in an operational mode unusable by said user, of the recording medium using a predetermined address;
    (b) comparing the first information with second information designed to be stored in the storage portion of the read only area of a true recording medium specified by said predetermined address; and
    (c) concluding that the recording medium is the true recording medium when the first information matches the second information.

12. The method as claimed in claim 11, wherein the recording medium is an optical disk.

13. A method for preventing unauthorized use of a recording medium having a user accessible area and a user inaccessible area which can be accessed in an operational mode unusable by said user, the method comprising the steps of:
    (a) generating a write instruction to record data in a storage area of the recording medium specified by a predetermined address indicating a read only area of a true recording medium;
    (b) determining whether or not the data can be recorded on the recording medium; and
    (c) concluding that the recording medium is the true recording medium when it is determined that the data cannot be recorded on the recording medium.

14. The method as claimed in claim 13, further comprising the step (d) of recording dummy data on the storage area of the recording medium specified by the predetermined address when it is determined that the data can be recorded on the recording medium.

15. The method as claimed in claim 13, wherein the recording medium is an optical disk.

16. A method for preventing unauthorized use of a recording medium having a user accessible area and a user inaccessible area which can be accessed in an operational mode unusable by said user, the method comprising the steps of:
(a) reading predetermined information from a predetermined storage area of the recording medium, said predetermined information being necessary to read data from the user accessible area of the recording medium;
(b) determining whether or not the predetermined information has been read from the predetermined storage area; and
(c) concluding that the recording medium is a true recording medium when it is determined that the predetermined information has been read.

17. The method as claimed in claim 16, wherein said predetermined storage area is provided in the user inaccessible area.

18. The method as claimed in claim 16, wherein said predetermined information indicates positions of files recorded on the user accessible area.

19. The method as claimed in claim 16, wherein:
said predetermined information is scrambled information; and
the method further comprises the step (d) of descrambling the scrambled information.

20. The method as claimed in claim 17, wherein:
the user accessible area comprises data fields and error correction code fields, error correction codes necessary for correcting error in data stored in the data fields being stored in the error correction code fields;
one of the data fields and one of the error correction code fields are paired and adjacent to each other; and
the true recording medium comprises a hidden error correction code stored in a predetermined one of the error correction code fields, said hidden error correction code correcting said predetermined information;
the step (a) comprises the step (a-1) of reading one of the error correction codes from said predetermined one of the error correction code fields;
the step (b) comprises the step (b-1) of determining whether or not error in said predetermined information can be corrected by said one of the error correction codes read from said predetermined one of the error correction code fields; and
the step (c) comprises the step (c-1) of determining the recording medium is the true recording medium when it is determined that the error in said predetermined information can be corrected by said one of the error correction codes, in which said one of the error correction codes corresponds to said hidden error correction code.

21. The method as claimed in claim 16, wherein the recording medium is an optical disk.

22. An apparatus for preventing unauthorized use of a recording medium having a user accessible area and a user inaccessible area which can be accessed in an operational mode unusable by said user, said apparatus; comprising:
first means for reading first information from the user inaccessible area, which can be accessed in an operational mode unusable by said user of the recording medium;
second means, coupled to the first means, for comparing the first information with second information concerning a true recording medium; and
third means, coupled to said first and second means, for concluding that the recording medium is the true recording medium when the first information matches the second information.

23. The apparatus as claimed in claim 22, wherein:
the first information indicates a storage capacity of a rewritable area in the user accessible area; and
the second information indicates a storage capacity of the rewritable area of the true recording medium.

24. The apparatus as claimed in claim 22, wherein:
the first information indicates a position of a dummy defective sector formed on the recording medium; and
the second information indicates a position of the dummy defective sector formed on the true recording medium.

25. The apparatus as claimed in claim 24, wherein the dummy defective sector is formed on a rewritable area in the user accessible area.

26. The apparatus as claimed in claim 22, wherein:
the first information indicates a number of sectors in a data area in the user accessible area which also has a spare area; and
the second information indicates a number of sectors in the data area in the user accessible area of the true recording medium.

27. The apparatus as claimed in claim 22, wherein the recording medium is an optical disk.

28. The apparatus as claimed in claim 22, wherein the recording medium is a magneto-optical disk.

29. The apparatus as claimed in claim 22, wherein the recording medium is an IC card.

30. The apparatus as claimed in claim 22, wherein the second information is stored in an application program.

31. The apparatus as claimed in claim 22, further comprising fourth means for activating the first means immediately after execution of an application program is started.

32. The apparatus as claimed in claim 22, further comprising fourth means for activating the first means when an application program needs data stored on the recording medium.

33. An apparatus for preventing unauthorized use of a recording medium having a user accessible area and a user inaccessible area which can be accessed in an operational mode unusable by said user, said apparatus comprising:
first means for reading first information from a storage portion of a read only area in the user accessible area of the recording medium using a predetermined address;
second means, coupled to said first means, for comparing the first information with second information designed to be stored in the storage portion of the read only area of a true recording medium specified by said predetermined address; and
third means, coupled to said first and second means, for concluding that the recording medium is the true recording medium when the first information matches the second information.

34. The apparatus as claimed in claim 33, wherein the recording medium is an optical disk.

35. An apparatus for preventing unauthorized use of a recording medium having a user accessible area and a user inaccessible area which can be accessed in an operational mode unusable by said user, said apparatus comprising:
- first means for generating a write instruction to record data in a storage area of the recording medium specified by a predetermined address indicating a read only area of a true recording medium;
- second means, coupled to said first means, for determining whether or not the data can be recorded on the recording medium; and
- third means, coupled to said first and second means, for concluding that the recording medium is the true recording medium when it is determined that the data cannot be recorded on the recording medium.

36. The apparatus as claimed in claim 35, further comprising fourth means for recording dummy data in the storage area of the recording medium specified by the predetermined address when it is determined that the data can be recorded on the recording medium.

37. The apparatus as claimed in claim 35, wherein the recording medium is an optical disk.

38. An apparatus for preventing unauthorized use of a recording medium having a user accessible area and a user inaccessible area which can be accessed in an operational mode unusable by said user, said apparatus comprising:
- first means for reading predetermined information from a predetermined storage area of the recording medium, said predetermined information being necessary to read data from the user accessible area of the recording medium;
- second means, coupled to said first means, for determining whether or not the predetermined information has been read from the predetermined storage area; and
- third means, coupled to said first and second means, for concluding that the recording medium is a true recording medium when it is determined that the predetermined information has been read.

39. The apparatus as claimed in claim 38, wherein said predetermined storage area is provided in the user inaccessible area.

40. The apparatus as claimed in claim 38, wherein said predetermined information indicates positions of files recorded on the user accessible area.

41. The apparatus as claimed in claim 38, wherein:
- said predetermined information is scrambled information; and
- the apparatus further comprises fourth means for descrambling the scrambled information.

42. The apparatus as claimed in claim 38, wherein:
- the user accessible area comprises data fields and error correction code fields, error correction codes necessary for correcting error in data stored in the data fields being stored in the error correction code fields;
- one of the data fields and one of the error correction code fields are paired and adjacent to each other; and
- the true recording medium comprises a hidden error correction code stored in a predetermined one of the error correction code fields, said hidden error correction code correcting said predetermined information;
- the first means comprises fourth means for reading one of the error correction codes from said predetermined one of the error correction code fields;
- the second means comprises fifth means for determining whether or not error in said predetermined information can be corrected by said one of the error correction codes read from said predetermined one of the error correction code fields; and
- the third means comprises sixth means for concluding that the recording medium is the true recording medium when it is determined that the error in said predetermined information can be corrected by said one of the error correction codes in which said one of the error correction codes corresponds to said hidden error correction code.

43. The apparatus as claimed in claim 38, wherein the recording medium is an optical disk.

44. An optical disk comprising:
- a user accessible area; and
- a user inaccessible area which can be accessed in an operational mode unusable by said user,
- the user inaccessible area which can be accessed in an operational mode unusable by said user, comprising first information to be read and compared with second information concerning a true recording medium in order to determine whether or not the recording medium is the true recording medium.

45. The optical disk as claimed in claim 44, wherein:
- the first information indicates a storage capacity of a rewritable area in the user accessible area; and
- the second information indicates a storage capacity of the rewritable area of the true recording medium.

46. The optical disk as claimed in claim 44, wherein:
- the first information indicates a position of a dummy defective sector formed on the recording medium; and
- the second information indicates a position of the dummy defective sector formed on the true recording medium.

47. The optical disk as claimed in claim 46, wherein the dummy defective sector is formed on a rewritable area in the user accessible area.

48. The optical disk as claimed in claim 44, wherein:
- the first information indicates a number of sectors in a data area in the user accessible area which also has a spare area; and
- the second information indicates a number of sectors in the data area in the user accessible area of the true recording medium.

49. An optical disk comprising:
- a user accessible area; and
- a user inaccessible area which can be accessed in an operational mode unusable by said user,
- the user accessible area comprising a storage portion of a read only area, said storage portion being specified by a predetermined address,
- first information being stored in said storage area to be read and compared with second information designed to be stored in the storage portion of the read only area of a true recording medium in order to determine whether or not the recording medium is the true recording medium.

50. An optical disk comprising:
- a user accessible area; and
- a user inaccessible area which can be accessed in an operational mode unusable by said user,
- predetermined information being stored in either the user accessible area or the user inaccessible area, the predetermined information being necessary to read data from the user accessible area of the recording medium.

51. The optical disk as claimed in claim 50, wherein said predetermined information indicates positions of files recorded in the suer accessible area.

52. The optical disk as claimed in claim 50, wherein said predetermined information is scrambled information.

53. The optical disk as claimed in claim 50, wherein:

the user accessible area comprises data fields and error correction code fields, error correction codes necessary for correcting error in data stored in the data fields being stored in the error correction code fields;

one of the data fields and one of the error correction code fields are paired and adjacent to each other; and the true recording medium comprises a hidden error correction code stored in a predetermined one of the error correction code fields, said hidden error correction code correcting said predetermined information, one of the error correction codes being read from said predetermined one of the error correction code fields in order to determine whether or not error in said predetermined information can be corrected by said one of the error correction codes read from said predetermined one of the error correction code fields, so that it is concluded that the recording medium is the true recording medium when it is determined that the error in said predetermined information can be corrected by said one of the error correction codes in which said one of the error correction codes matches said hidden error correction code.

* * * * *